(12) United States Patent
Yokozeki et al.

(10) Patent No.: US 10,579,864 B2
(45) Date of Patent: Mar. 3, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Makoto Yokozeki, Yokohama (JP); Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 15/873,801

(22) Filed: Jan. 17, 2018

(65) Prior Publication Data

US 2018/0204053 A1    Jul. 19, 2018

(30) Foreign Application Priority Data

Jan. 19, 2017 (JP) .................................. 2017-007529

(51) Int. Cl.
  *G06K 9/00* (2006.01)
  *G06T 7/20* (2017.01)
  *G06K 9/62* (2006.01)

(52) U.S. Cl.
  CPC ..... *G06K 9/00288* (2013.01); *G06K 9/00228* (2013.01); *G06K 9/00261* (2013.01); *G06K 9/00281* (2013.01); *G06K 9/6215* (2013.01); *G06T 7/20* (2013.01)

(58) Field of Classification Search
  None
  See application file for complete search history.

(56) References Cited

U.S. PATENT DOCUMENTS

| | | | | |
|---|---|---|---|---|
| 2011/0311112 | A1* | 12/2011 | Matsuyama | ....... G06K 9/00281 382/118 |
| 2012/0076360 | A1* | 3/2012 | Shibata | .................. G11B 27/28 382/103 |
| 2015/0146010 | A1* | 5/2015 | Yokozeki | ........... G06K 9/00228 348/169 |
| 2017/0091952 | A1* | 3/2017 | Sun | .......................... G06T 5/10 |
| 2018/0053294 | A1* | 2/2018 | Rastgar | .................. G06T 7/246 |

FOREIGN PATENT DOCUMENTS

JP        2013101551 A        5/2013

* cited by examiner

*Primary Examiner* — David Perlman
(74) *Attorney, Agent, or Firm* — Canon U.S.A., Inc. IP Division

(57) ABSTRACT

A face detection circuit of an image processing apparatus detects a face region from a video signal. An individual recognition circuit performs individual recognition processing based on a comparison of a similarity between feature information extracted from the face region and registered feature information with a predetermined threshold value. A camera microcomputer tracks a face recognized by the individual recognition circuit and stores information about the tracked face. Further, in a case where the recognized face is not tracked and recognition information about a first subject is not stored, the camera microcomputer sets a first threshold value as a predetermined threshold value for the first subject. On the other hand, in a case where the recognition information about the first subject region is stored, the camera microcomputer sets as the predetermined threshold value for the first subject a second threshold value which is lower than the first threshold value.

20 Claims, 9 Drawing Sheets

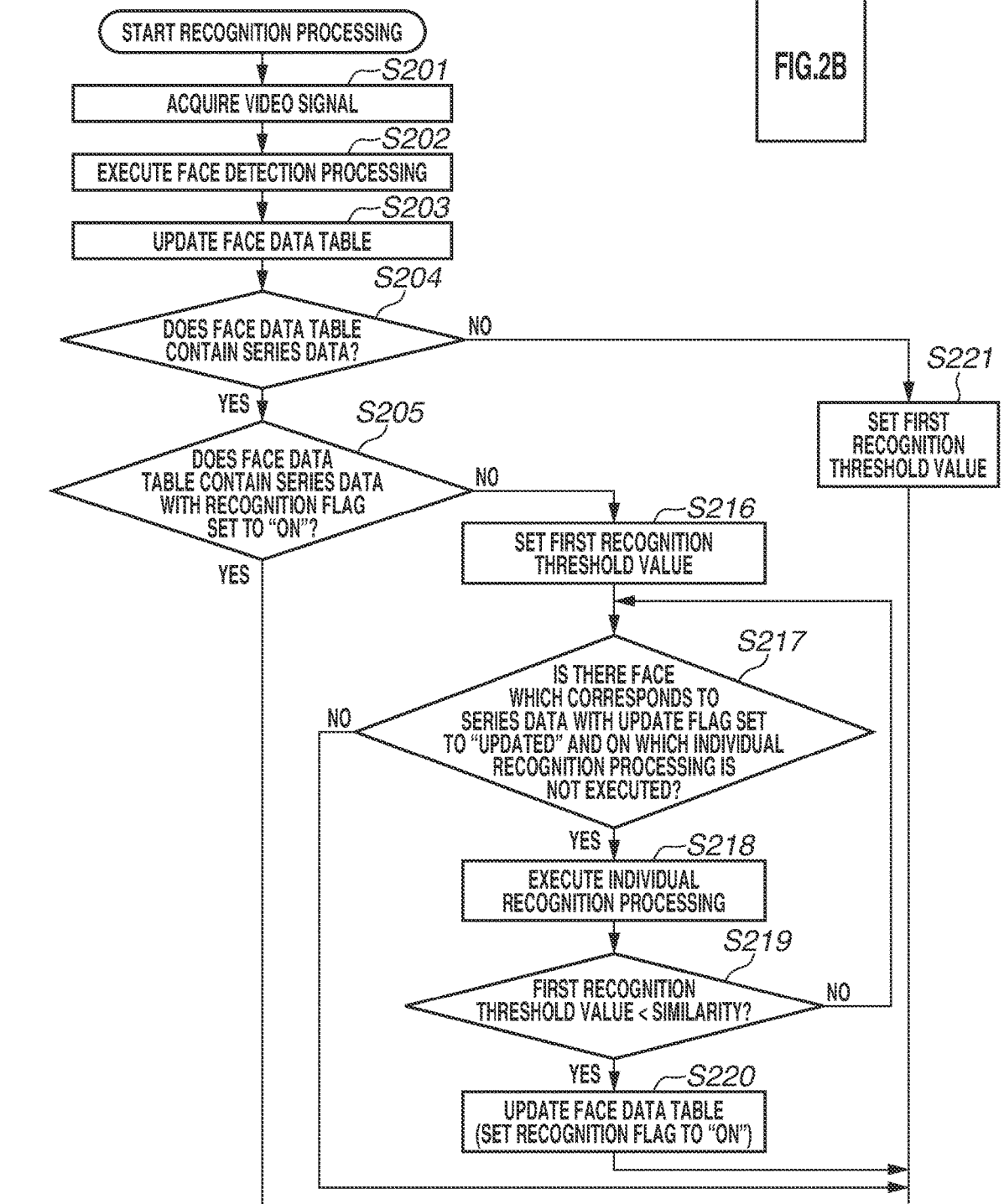

| FACE ID | FACE POSITION | FACE SIZE | FACE ANGLE | UPDATE FLAG | RECOGNITION FLAG |
|---|---|---|---|---|---|
| 1 | X1, Y1 | MEDIUM | 0°C | UPDATED | ON |
| 2 | X2, Y2 | SMALL | 45°C | UPDATED | OFF |
| 3 | X3, Y3 | LARGE | 90°C | NOT UPDATED | OFF |
| ⋮ | ⋮ | ⋮ | ⋮ | ⋮ | ⋮ |

| THRESHOLD VALUE TABLE | | FACE ANGLE | | |
|---|---|---|---|---|
| | | 0°C | 45°C | 90°C |
| FACE SIZE | LARGE | 9 | 8 | 8 |
| | MEDIUM | 9 | 7 | 4 |
| | SMALL | 7 | 8 | 4 |

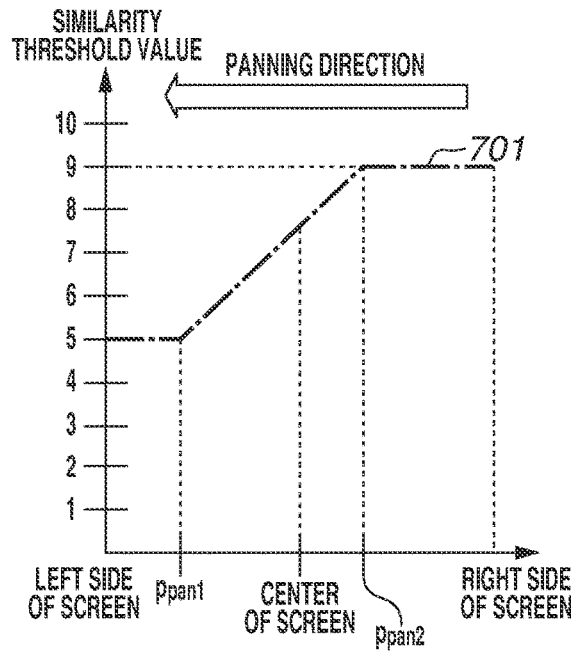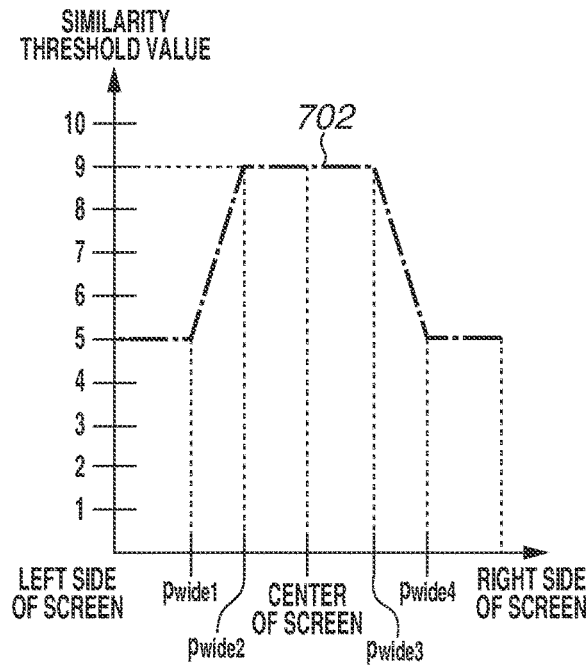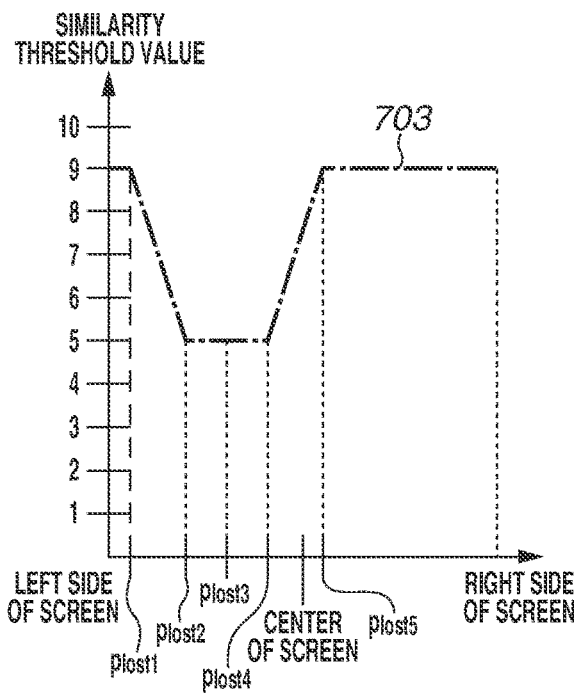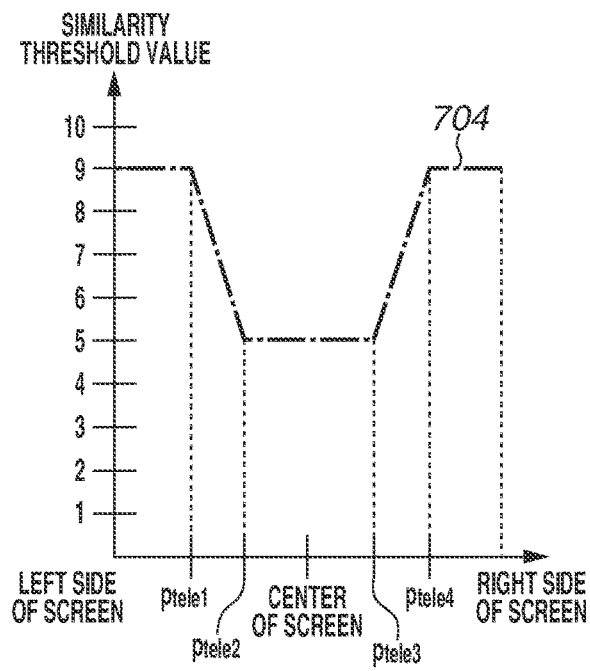

IMAGE PROCESSING APPARATUS, IMAGE PROCESSING METHOD, AND STORAGE MEDIUM

BACKGROUND

Field of the Disclosure

The present disclosure relates to an image processing apparatus configured to perform image recognition processing, an image processing method, and a storage medium.

Description of the Related Art

In recent years, image capturing apparatuses such as video cameras employ individual recognition techniques in which a subject region (e.g., face region) is periodically detected from video signals acquired by photoelectrically converting subject images with an image sensor and the detected subject region is compared with face feature information prepared in advance to determine whether the detected subject region is the face of a specific person. The individual recognition techniques enable execution of autofocus (AF) control and auto exposure (AE) control on the face of a specific person to make it possible to capture images which are more reflective of user intention.

However, the detected face is not always in the best face state for individual recognition. For example, a change in facial expression, orientation, etc. can affect the face feature information to change the face feature information to different face feature information from the face feature information stored in advance, making it difficult to acquire individual recognition results with high reliability.

Further, Japanese Patent Application Laid-Open No. 2013-101551 discusses a method which includes registering a plurality of face images of a person, calculating as a registered person detection rate the percentage of face regions identified as a recognition candidate person among face regions detected in a predetermined number of monitoring images, and changing a threshold value for use in determining as to whether a person is a registered person based on the detection rate. More specifically, the threshold value is set to a low value if the detection rate is high, whereas the threshold value is set to a high value if the detection rate is low. By this method, even if the similarity between the person and the registered face images is low due to a change in facial expression or orientation, the person is successfully determined as the registered person while the possibility that a person other than the registered person is misrecognized as the registered person is reduced.

However, in the method discussed in Japanese Patent Application Laid-Open No. 2013-101551, in order for the person to be determined as the registered person in the situation in which the similarity is low, the person needs to be determined as the recognition candidate person in a larger number of monitoring images, so it can take a long time to determine the person as the recognition candidate person. Thus, for example, in the scene in which the registered person being recognized is lost and then detected again, before the person detected again is determined as the registered person, AF control and AE control are executed on another face or subject.

SUMMARY

According to an aspect of the present disclosure, an image processing apparatus includes a detection circuit configured to detect a predetermined subject region from a video signal, a recognition circuit configured to perform recognition processing on the subject region detected by the detection circuit, based on a comparison of a similarity between feature information extracted from the subject region and registered feature information with a predetermined threshold value, a tracking circuit configured to track a recognized subject region on which the recognition processing has been performed by the recognition circuit, and a setting circuit configured to set the predetermined threshold value, wherein the setting circuit stores information about the recognized subject region tracked by the tracking circuit, wherein, in a case where the tracking circuit does not track the recognized subject region and the setting circuit does not store recognition information about a first subject, the setting circuit sets a first threshold value as the predetermined threshold value for the first subject, and wherein, in a case where the tracking circuit does not track the recognized subject region and the setting circuit stores the recognition information about the first subject, the setting circuit sets, as the predetermined threshold value for the first subject, a second threshold value that is lower than the first threshold value.

Further features of the present disclosure will become apparent from the following description of exemplary embodiments with reference to the attached drawings.

BRIEF DESCRIPTION OF THE DRAWINGS

FIG. 5 illustrates an example of a second recognition threshold value table according to one or more aspects of the present disclosure.

FIG. 7A illustrates an example of the second recognition threshold value setting according to screen positions in a case in which a panning operation is detected. FIG. 7B illustrates an example of the second recognition threshold value setting according to screen positions in a case in which a zoom is driven in a wide direction. FIG. 7C illustrates an example of the second recognition threshold value setting according to positions in which a recognized face is lost. FIG. 7D illustrates an example of the second recognition threshold value setting according to screen positions in a case in which the driving of a zoom in a tele-direction is detected.

DESCRIPTION OF THE EMBODIMENTS

Various exemplary embodiments of the present disclosure will be described in detail below with reference to the drawings.

An image processing apparatus according to an exemplary embodiment of the present disclosure is applicable to various image capturing apparatuses such as digital cameras, digital video cameras, various mobile terminals including a camera function such as smartphones and tablet terminals, industrial cameras, in-car cameras, and medical cameras. In the present exemplary embodiment, a video camera including an individual recognition function will be described as an example. The video camera detects a face region of a person as a predetermined subject region from a captured image and performs individual recognition using the detected face region. While the video camera is described as an example in the present exemplary embodiment, any other image capturing apparatuses such as a digital still camera can be employed.

Figure 1:
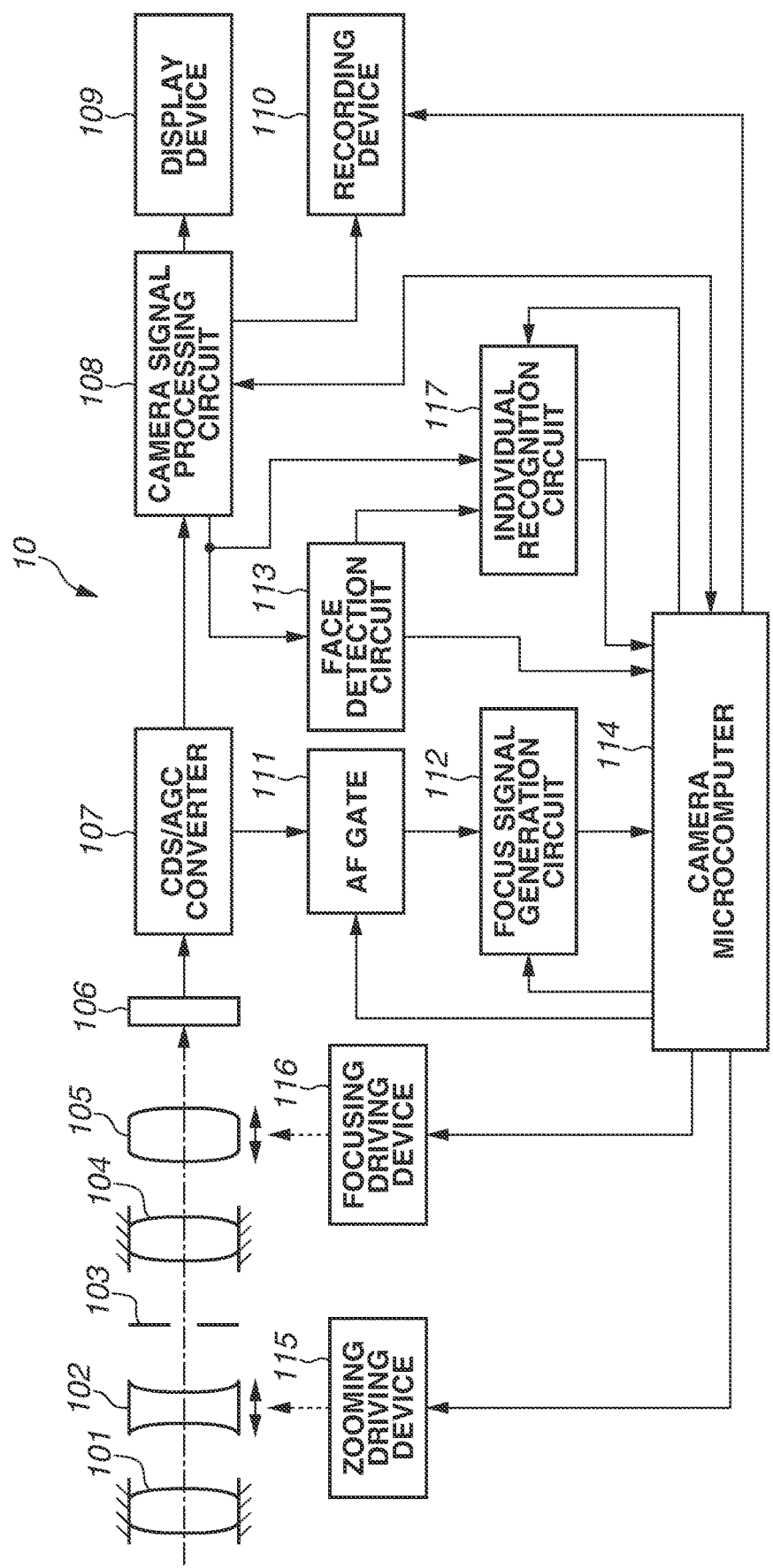
FIG. 1 is a block diagram schematically illustrating an example of a configuration of a video camera according to one or more aspects of the present disclosure.

FIG. 1 schematically illustrates a configuration of a video camera 10 which is an application example of the image processing apparatus according to the present exemplary embodiment.

The video camera 10 in FIG. 1 includes as an image capturing optical system a first fixed lens 101, a zoom lens 102, a diaphragm 103, a second fixed lens 104, and a focus lens 105. The zoom lens 102 is a zoom lens which is moved in an optical axis direction to zoom in or out. The zoom ratio is changeable by moving the zoom lens 102 in the optical axis direction, i.e., by moving the zoom lens 102 in a so-called tele-direction, wide direction, etc. The focus lens 105 is a lens (also referred to as "focus compensator lens" or "focus adjustment member") for adjusting the focus of the image capturing optical system and includes not only a so-called focusing function but also a function of correcting focal plane movements caused by the zooming.

A zooming driving device 115 includes an actuator for moving the zoom lens 102 in the optical axis direction and a circuit for driving the actuator. A focusing driving device 116 includes an actuator for moving the focus lens 105 in the optical axis direction and a circuit for driving the actuator. The zooming driving device 115 and the focusing driving device 116 include the actuators such as a stepping motor, direct current (DC) motor, vibration motor, or voice coil motor.

An image sensor 106 is a photoelectric conversion element including a charge-coupled device (CCD) sensor or complementary metal oxide semiconductor (CMOS) sensor. A converter 107 is a correlated double sampling (CDS)/automatic gain control (AGC)/analog-digital (AD) converter which performs sampling, gain adjustment, and digitalization on the output of the image sensor 106. A camera signal processing circuit 108 performs various types of image processing on output signals from the converter 107 to generate video signals. A display device 109 displays video images based on the video signals from the camera signal processing circuit 108. A recording device 110 records the video signals from the camera signal processing circuit 108 on a recording medium such as a magnetic tape, optical disk, or semiconductor memory.

An autofocus (AF) gate 111 passes only a signal of a region which is used in focus detection, more specifically a region (AF frame) set by a camera microcomputer 114 described below, among the output signals of all pixels from the converter 107, and outputs the passed signal to a focus signal generation circuit 112. The focus signal generation circuit 112 generates a focus signal from the signal passed through the AF gate 111. The focus signal can be a value representing the sharpness (contrast state) of the video signal generated based on the output signal from the image sensor 106 or can be a value representing the distance to a subject or defocus amount based on a phase difference of an image signal for focus detection.

A face detection circuit 113 performs publicly-known face detection processing on the video signal supplied from the camera signal processing circuit 108 to detect the position, size, and angle (roll, pitch, yaw) of a face region of a person in an image-capturing screen. Examples of a method that can be used for face detection processing include a method in which a flesh color region is extracted based on gradation colors of pixels of a captured image and the matching level of the contour of the flesh color region and a face contour plate prepared in advance is calculated to detect a face based on the matching level. Another example of the method that can be used for face detection processing is a method in which pattern recognition is performed based on feature points of the face such as the eyes, nose, and mouth extracted from captured images. The face detection circuit 113 transmits results of face detection processing performed on each frame of the video signal to the camera microcomputer 114 described below and an individual recognition circuit 117 described below.

The individual recognition circuit 117 compares a face image of a recognition target person (a registered face image of a registered person) which is stored on a random-access memory (RAM) (not illustrated) in the camera microcomputer 114 with the face image detected by the face detection circuit 113 to determine whether a person similar to the registered person is in the image-capturing screen. More specifically, first, the individual recognition circuit 117 calculates the similarity between the face image detected by the face detection circuit 113 and the registered face image stored on the RAM in the camera microcomputer 114. Next, the individual recognition circuit 117 determines whether the calculated similarity is greater than a predetermined recognition threshold value. If the calculated similarity is greater than the recognition threshold value, the individual recognition circuit 117 determines that the face image detected by the face detection circuit 113 is an image of the face of the registered person (i.e., the individual recognition circuit 117 determines that the person is recognized). Examples of a method for calculating the similarity include a method in which the size, angle, luminance, etc. of the face image are normalized and then components calculated by Karhunen-Loève (KL) expansion of a Fourier spectrum are determined as feature information about the face image to obtain the matching level of the feature information about the face image and feature information about the registered face image. Another example of the method for calculating the similarity is a method in which information obtained by normalizing detected face image data by face size is determined as feature information and the matching level of the feature information about the face image and the feature information about the registered face image is obtained. In the description of the present exemplary embodiment, the registered face image stored on the RAM in the camera microcomputer 114 can be the face image data which is compressed and saved or can be information indicating feature amounts of the face such as the eyes, nose, mouth, and eyebrow.

The camera microcomputer 114 controls the AF gate 111 such that the AF frame is set in a position corresponding to the face of a subject person in the image-capturing screen based on the results of face detection performed by the face detection circuit 113 and individual recognition performed by the individual recognition circuit 117. Then, the camera microcomputer 114 performs AF control by controlling the focusing driving device 116 to drive the focus lens 105 based on the focus signal generated from the output signal of the AF gate 111 by the focus signal generation circuit 112. In the case in which there is a focal plane movement caused by the zooming executed by driving the zoom lens 102, the camera microcomputer 114 controls the focusing driving device 116 to drive the focus lens 105 such that the focal plane movement caused by the zooming is corrected.

Further, as described above, the camera microcomputer 114 drives the zoom lens 102 through the control performed by the zooming driving device 115. Thus, the camera microcomputer 114 can perform, for example, detection of a start of a zoom operation, detection of a zoom amount in a zoom operation, tele-detection for detecting that a zoom operation is in the tele-direction, and wide detection for detecting that a zoom operation is in the wide direction.

Further, the camera microcomputer 114 can also perform panning/tilting operation detection processing to detect a panning operation or a tilting operation of the video camera 10. The panning/tilting operation detection processing includes, for example, detection of a start of a panning operation or a tilting operation, detection of a panning direction or a tilting direction, and detection of a panning amount or a tilting amount. The above-described panning/tilting operation detection processing can be performed using a publicly-known technique such as detection processing based on motion vectors of the video signal from the camera signal processing circuit 108 and detection processing based on output of a direction sensor (not illustrated), tilt sensor (not illustrated), etc.

The camera microcomputer 114 repeatedly executes AF frame setting processing, zoom operation detection processing, panning/tilting operation detection processing, etc. as described above at every predetermined timing (e.g., period of time when a vertical synchronization signal of the video signal is generated). The period of time when the vertical synchronization signal is generated is also referred to as "V-period" and the timing as "V-timing". Besides the above-described processing, the camera microcomputer 114 also performs processing such as processing of outputting image recording instructions to the recording device 110.

Further, the camera microcomputer 114 performs not only the above-described processing but also tracking processing of tracking (following) a face region (main face region) of a main subject person in the image-capturing screen based on the results of face detection performed by the face detection circuit 113 and individual recognition performed by the individual recognition circuit 117. As to the specific tracking processing on the face region, a publicly-known technique can be used, and details thereof will be described below. Further, the camera microcomputer 114 can use information about the above-described zoom operation detection processing and information about the above-described panning/tilting operation detection processing in the tracking processing on the face region. Details thereof will be described below.

<Face Detection Processing, Individual Recognition Processing, and Tracking Processing>

Next, the face detection processing, individual recognition processing, and tracking processing performed by the face detection circuit 113, the individual recognition circuit 117, and the camera microcomputer 114 according to the present exemplary embodiment will be described below with reference to flowcharts illustrated in FIGS. 2 (2A and 2B), 3A, 3B, 3C, and 3D. Processes illustrated in the flowcharts can be executed by hardware configurations, or a central processing unit (CPU) or the like can execute a program to realize the processes. Further, steps S201 to S220 and steps S301 to S306 in the flowcharts described below are respectively referred to as S201 to S220 and S301 to S306. FIGS. 3A to 3D are flowcharts illustrating details of second recognition threshold value calculation processing executed in step S215 in FIGS. 2 (2A and 2B).

Figure 2B:
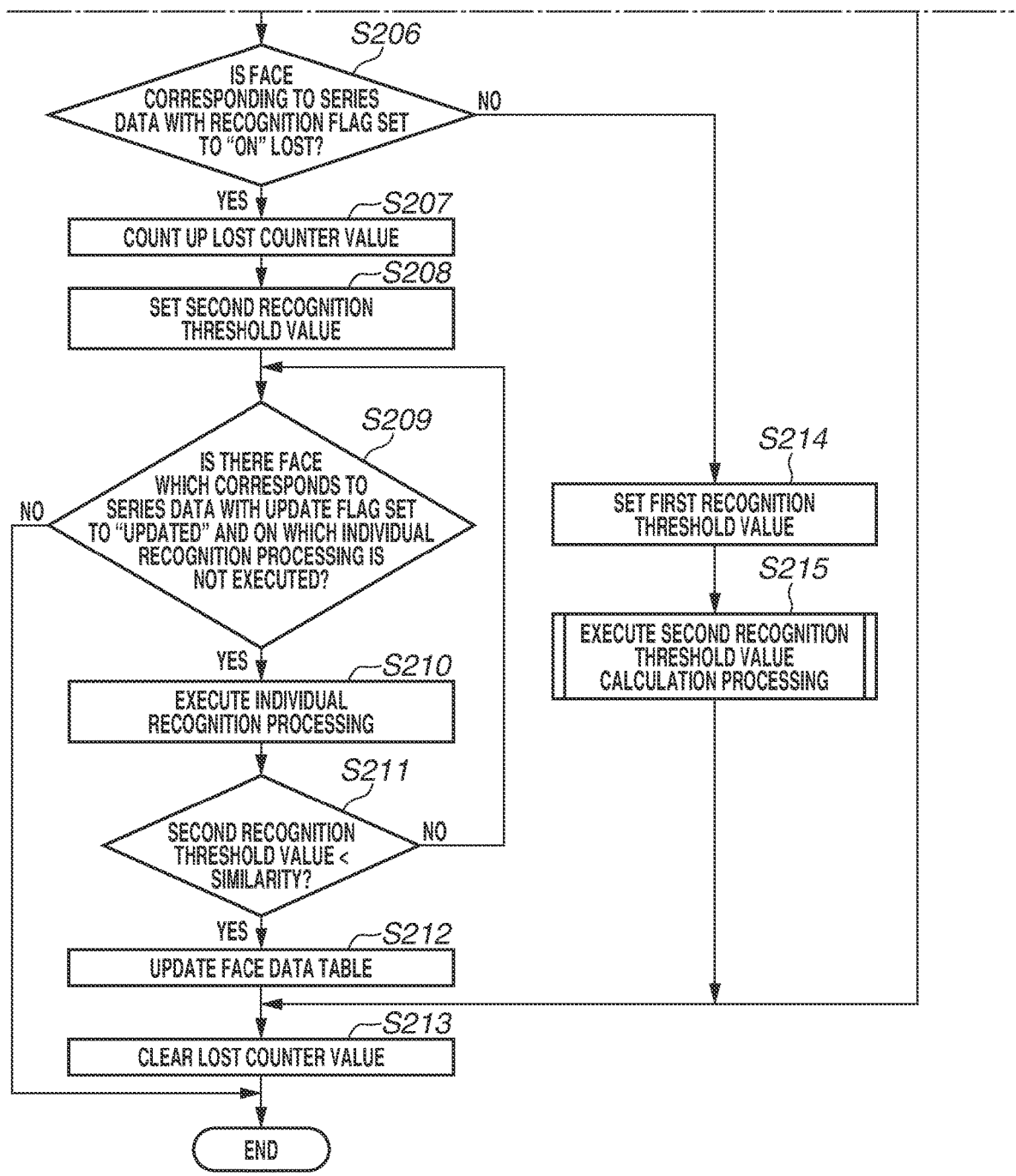
FIGS. 2 (2A and 2B) is a flowchart illustrating individual recognition operation processing according to one or more aspects of the present disclosure.

If the individual recognition processing illustrated in the flowchart in FIGS. 2 (2A and 2B) is started, first, in step S201, the face detection circuit 113 acquires a video signal from the camera signal processing circuit 108. Next, in step S202, the face detection circuit 113 executes face detection processing to extract a face region(s) from the video signal acquired in step S201. Then, if the face detection circuit 113 successfully extracts a face region(s), the face detection circuit 113 outputs to the camera microcomputer 114 the number of extracted face regions and face information about the position, size, and angle of each extracted face region. In this way, the camera microcomputer 114 acquires the face information.

Next, in step S203, the camera microcomputer 114 updates a face data table based on the face information acquired in step S202.

Figure 4:
FIG. 4 illustrates an example of a face data table according to one or more aspects of the present disclosure.

The following describes an example of the face data table in detail with reference to FIG. 4.

FIG. 4 illustrates a face data table 401 which is a table for managing a single piece of series data for each person identified by the camera microcomputer 114. The series data is a set of data specified in rows of the face data table 401 and includes a face identifier (ID) 402, a face position 403, a face size 404, a face angle 405, an update flag 406, and a recognition flag 407. The camera microcomputer 114 manages the face data table 401 and stores the face data table 401 in the RAM (not illustrated) in the camera microcomputer 114. The face ID 402 is an identification number for distinguishing the persons identified by the camera microcomputer 114, and the same identification number is consistently assigned to a person while the camera microcomputer 114 is performing tracking processing on the person.

The camera microcomputer 114, for example, compares the face information acquired in step S202 with the face position 403 and the face size 404 of each piece of series data, and if a difference in position and a difference in size are each within a predetermined range, the camera microcomputer 114 determines that the person (face) is tracked. Further, the camera microcomputer 114 updates the face position 403, the face size 404, and the face angle 405 of the series data corresponding to the person determined as being tracked with the face information acquired in step S202 and changes the update flag 406 to "updated". Further, in the determination of whether the person (face) is being tracked, even if the face information acquired in step S202 does not include face information corresponding to the series data, the camera microcomputer 114 can compare as the face information a face region estimated based on color information and luminance information about each face.

The face position 403, the face size 404, and the face angle 405 respectively indicate position coordinate information, size information, and angle information about the face region extracted from the video signal. While the face size 404 is specified in three levels of large, medium, and small in the example illustrated in FIG. 4, the face size 404 can be specified in any other form. For example, the face size 404 can be specified by recording the number of pixels of the video signal. Further, while the face angle 405 is specified in three levels of 0, 45, and 90 degrees in the example illustrated in FIG. 4, the face angle 405 can be specified in any other form. For example, the face angle 405 can be specified by recording information in increments of one degree from minus 180 degrees to plus 180 degrees.

The update flag 406 is a flag which indicates as to whether the face position 403, the face size 404, and the face angle 405 are updated with the latest face information acquired in step S202. The camera microcomputer 114 compares the face information acquired in step S202 with each piece of series data of the face data table 401 and judges whether to change the update flag 406 to "updated" based on whether it is determined that the person is determined as the same person. Thus, if there is no face information determined as the same person from the pieces of series data of the face data table 401, the update flag 406 continues to be "not updated". If the update flag 406 of the face data table 401 continues to be "not updated" for a predetermined time period, the camera microcomputer 114 determines that the person of the series data corresponding to the update flag 406 disappears from the image-capturing screen, and the camera microcomputer 114 deletes the series data from the face data table 401. Further, the update flag 406 in the face data table 401 is all changed (initialized) to "not updated" before the processing in step S203 is started.

The recognition flag 407 is a flag which is set to "ON" if it is determined that an individual is successfully recognized as a result of execution of individual recognition processing by the individual recognition circuit 117 in steps S210 to S212 and steps S218 to S220 described below. A face for which the recognition flag 407 is set to "ON" can be determined as a recognized face while the camera microcomputer 114 determines that the face is being tracked, so the recognition flag 407 continues to be "ON" even if recognition processing is not executed thereafter. Thus, the recognized face continues to be in the recognized state even if the face turns sideways, etc. to decrease the similarity to the registered face image.

The following is a further description of the flowchart illustrated in FIGS. 2 (2A and 2B). After step S203, the processing proceeds to step S204.

In step S204, the camera microcomputer 114 determines whether the face data table 401 updated in step S203 contains one or more pieces of series data. In step S204, if the camera microcomputer 114 determines that the updated face data table 401 contains one or more pieces of series data (YES in step S204), the processing proceeds to step S205. On the other hand, if the camera microcomputer 114 determines that the updated face data table 401 contains no series data (NO in step S204), the camera microcomputer 114 determines that all the faces (persons) in the video image disappear, and the processing proceeds to step S221.

In step S205, the camera microcomputer 114 determines whether the face data table 401 updated in step S203 contains series data with the recognition flag 407 set to "ON". In step S205, if the camera microcomputer 114 determines that the updated face data table 401 contains series data with the recognition flag 407 set to "ON" (YES in step S205), the processing proceeds to step S206. On the other hand, in step S205, if the camera microcomputer 114 determines that the updated face data table 401 does not contain series data with the recognition flag 407 set to "ON" (NO in step S205), the processing proceeds to step S216.

In step S206, the camera microcomputer 114 determines whether the recognized face corresponding to the series data with the recognition flag 407 set to "ON" in the face data table 401 is lost (i.e., whether the recognized face is no longer tracked and is lost). In other words, the camera microcomputer 114 determines whether the update flag 406 of the series data corresponding to the recognized face is set to "not updated". In step S206, if the camera microcomputer 114 determines that the recognized face is lost (YES in step S206), the processing proceeds to step S207. On the other hand, if the camera microcomputer 114 determines that the recognized face is not lost (NO in step S206), the processing proceeds to step S214.

In step S207, the camera microcomputer 114 counts up a lost counter value saved in the RAM in the camera microcomputer 114. The lost counter value is used in a case of changing a second recognition threshold value based on time when the second recognition threshold value is set in step S208 described below.

Next, in step S208, the camera microcomputer 114 sets the second recognition threshold value described below. The second recognition threshold value is a value obtained by second recognition threshold value calculation processing in step S215 described below, and details of the second recognition threshold value calculation processing will be described below. In the present exemplary embodiment, the second recognition threshold value is set lower than a first recognition threshold value described below. Further, in step S208, the camera microcomputer 114 performs processing to change the second recognition threshold value based on the above-described lost counter value. Details of the processing of changing the second recognition threshold value will be described below with reference to FIGS. 8A to 8D.

Next, in step S209, the camera microcomputer 114 determines whether there is series data corresponding to the face on which individual recognition processing is not executed by the individual recognition circuit 117 among the faces corresponding to the series data with the update flag 406 set to "updated". In step S209, if the camera microcomputer 114 determines that there is series data corresponding to the face on which individual recognition processing is not executed (YES in step S209), the processing proceeds to step S210. The processing in step S210 is executed by the individual recognition circuit 117. On the other hand, in step S209, if the camera microcomputer 114 determines that there is no series data corresponding to the face on which individual recognition processing is not executed (NO in step S209), the process in the flowchart illustrated in FIGS. 2 (2A and 2B) is ended. The case in which there is no series data corresponding to the face on which individual recognition processing is not executed is the case in which individual recognition processing is executed on all the faces corresponding to the series data with the update flag 406 set to "updated".

In step S210, the individual recognition circuit 117 waits for input of an instruction to execute individual recognition processing on the face corresponding to the series data on which individual recognition processing is not executed from the camera microcomputer 114. If the individual recognition circuit 117 receives an instruction to execute individual recognition processing, the individual recognition circuit 117 calculates the similarity between the face region corresponding to the series data designated by the camera microcomputer 114 among the face regions detected by the face detection circuit 113 and the registered face image stored in the RAM of the camera microcomputer 114. Then, the individual recognition circuit 117 notifies the camera microcomputer 114 of the calculated similarity, and then the processing proceeds to step S211. The processing in step S211 is executed by the camera microcomputer 114.

In step S211, the camera microcomputer 114 compares the similarity calculated in step S210 with the second recognition threshold value set in step S208 to determine whether the similarity is greater than the second recognition threshold value. In step S211, if the camera microcomputer 114 determines that the similarity is greater than the second recognition threshold value (YES in step S211), the processing proceeds to step S212. On the other hand, if the camera microcomputer 114 determines that the similarity is not greater than the second recognition threshold value (NO in step S211), the processing returns to step S209.

In step S211, if the camera microcomputer 114 determines that the similarity is greater than the second recognition threshold value, it can be determined that the lost recognized face is found again. In other words, it can be determined that the series data on which individual recognition processing is executed in step S210 is supposed to be series data with the recognition flag 407 set to "ON". Thus, in step S212, the camera microcomputer 114 overwrites the series data with the recognition flag 407 set to "ON" with the face information (the face position 403, the face size 404, the face angle 405) about the series data on which individual recognition processing is executed in step S210. Further, the camera microcomputer 114 changes the update flag 406 to "updated" and deletes the original series data on which individual recognition processing is executed.

Thereafter, in step S213, the camera microcomputer 114 clears the lost counter value, and then the process illustrated in the flowchart in FIGS. 2 (2A and 2B) is ended.

Further, in step S214, the camera microcomputer 114 sets the first recognition threshold value as a threshold value to be compared with the similarity. More specifically, the processing in step S214 is executed in the case in which the face corresponding to the series data with the recognition flag 407 set to "ON" in the face data table 401 is not lost, and in this case, the first recognition threshold value is set as a threshold value to be compared with the similarity. The first recognition threshold value is set greater than the second recognition threshold value. Details thereof will be described below. After step S214, the processing proceeds to step S215.

In step S215, the camera microcomputer 114 executes processing to calculate the second recognition threshold value which is used when the recognized face is lost, and then the processing proceeds to step S213. Details of the second recognition threshold value calculation processing in step S215 will be described below.

Further, in step S216, the camera microcomputer 114 sets the first recognition threshold value as a recognition threshold value. More specifically, the processing in step S216 is executed in the case in which the face data table 401 contains no series data with the recognition flag 407 set to "ON". The case in which the face data table 401 contains no series data with the recognition flag 407 set to "ON" is considered as a case in which either the face of the same person as the registered person has never appeared or the person disappears and continues to not appear thereafter for a predetermined time period or longer. The case in which the person disappears and continues to not appear thereafter for a predetermined time period or longer includes a case in which there is no recognizable face. A possible reason for occurrence of such a state is that, for example, there is no registered person near an image-capturing person or the image-capturing person changes the main subject. Thus, in this case, the camera microcomputer 114 sets the recognition threshold value to the first recognition threshold value to prevent misrecognition of another subject. After step S216, the processing proceeds to step S217.

In step S217, the camera microcomputer 114 determines whether there is series data corresponding to the face on which individual recognition processing is not executed by the individual recognition circuit 117 among the faces corresponding to the series data with the update flag 406 set to "updated", as in step S209. In step S217, if the camera microcomputer 114 determines that there is series data corresponding to the face on which individual recognition processing is not executed (YES in step S217), the processing proceeds to step S218. The processing in step S218 is executed by the individual recognition circuit 117. On the other hand, in step S217, if the camera microcomputer 114 determines that there is no series data corresponding to the face on which individual recognition processing is not executed (NO in step S217), i.e., if individual recognition processing is executed on all the faces corresponding to the series data with the update flag 406 set to "updated", the processing proceeds to step S213.

In step S218, the individual recognition circuit 117 waits for input of an instruction to execute individual recognition processing on the face corresponding to the series data on which individual recognition processing is not executed from the camera microcomputer 114, as in step S210. If the individual recognition circuit 117 receives an instruction to execute individual recognition processing, the individual recognition circuit 117 calculates the similarity between the face region corresponding to the series data designated by the camera microcomputer 114 among the face regions detected by the face detection circuit 113 and the registered face image stored in the RAM of the camera microcomputer 114. Then, the individual recognition circuit 117 notifies the camera microcomputer 114 of the calculated similarity, and then the processing proceeds to step S219. The processing in step S219 is executed by the camera microcomputer 114.

In step S219, the camera microcomputer 114 compares the similarity calculated in step S218 with the first recognition threshold value set in step S216 to determine whether the similarity is greater than the first recognition threshold value. If the camera microcomputer 114 determines that the similarity is greater than the first recognition threshold value (YES in step S219), the processing proceeds to step S220. On the other hand, if the similarity is not greater than the first recognition threshold value (NO in step S219), the processing returns to step S217.

In step S219, if the camera microcomputer 114 determines that the similarity is greater than the first recognition threshold value, it can be determined that either the face of the same person as the registered person appears for the first time or the registered person disappears, continues to not appear thereafter for a predetermined time period or longer, and then appears again. Thus, in step S220, the camera microcomputer 114 sets to "ON" the recognition flag 407 of the series data corresponding to the face on which individual recognition is executed in step S218, and then the processing proceeds to step S213.

The processing in step S221 is executed in the case in which the face data table 401 contains no data in step S204, so the camera microcomputer 114 sets the first recognition threshold value as an individual recognition threshold value, and then the processing proceeds to step S213.

<Description of Second Recognition Threshold Value Calculation Processing>

Next, the second recognition threshold value calculation processing executed in step S215 described above will be described below with reference to FIGS. 3A to 3D, 5, and 6A to 6D.

Figure 6A:
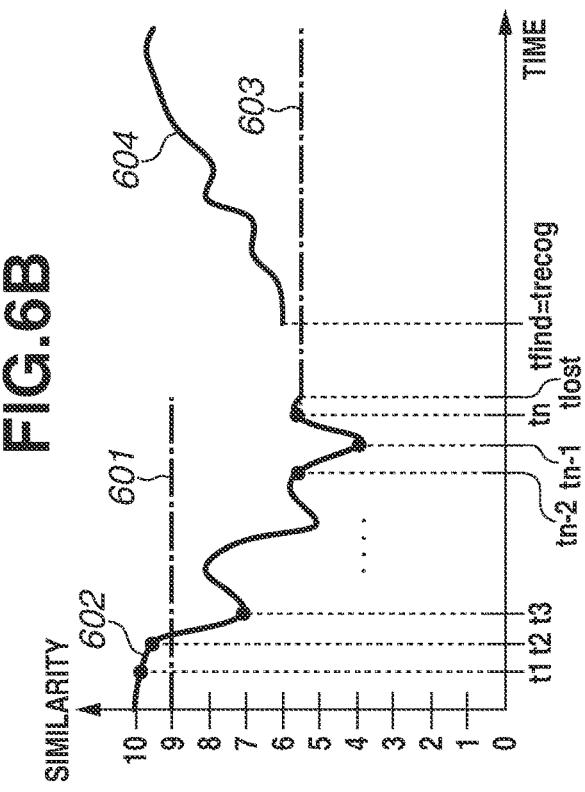
FIGS. 6A, 6B, 6C, and 6D respectively illustrate concepts of first, second, third, and fourth patterns of an operation of setting a second recognition threshold value according to one or more aspects of the present disclosure.

FIGS. 3A to 3D are flowcharts illustrating four patterns (first to fourth patterns) of the second recognition threshold value calculation processing executed in step S215 in FIGS. 2 (2A and 2B). FIGS. 3A, 3B, 3C, and 3D are respectively the flowcharts of the first, second, third, and fourth patterns of the second recognition threshold value calculation processing. Further, FIG. 5 illustrates a second recognition threshold value table described below with reference to FIG. 3D. Further, FIGS. 6A to 6D respectively illustrate examples of operations executed at the time of execution of the second recognition threshold value calculation processing in the flowcharts illustrated in FIGS. 3A to 3D. The vertical axis in each of FIGS. 6A to 6D represents the above-described similarity in 11 levels of "0" to "10", and greater values correspond to higher similarities whereas smaller values correspond to lower similarities. Further, the horizontal axis in each of FIGS. 6A to 6D represents the length of time from a given time defined as time 0. On the horizontal axis in each of FIGS. 6A to 6D, the time period from the time 0 to time tlost is a time period during which the registered person is recognized, the time tlost is the time at which sight of the recognized face is lost (time at which the recognized face becomes unable to be tracked and is lost), and time tfind is the time at which the face of a person is detected again. At the time tfind, the person is not recognized as the registered person, yet. Further, time trecog is a timing at which the registered person lost at the time tlost is recognized again. In FIG. 6A, time tfind=time trecog, and this is an example of the case in which a person detected again at the time tfind is promptly recognized again as the registered person. Further, while the first recognition threshold value is defined as being set to "9" in the present exemplary embodiment, this numerical value is a value set for descriptive purposes to describe the present exemplary embodiment, and the first recognition threshold value is not limited to the numerical value. Further, the same values and graphs are given the same reference numbers in FIGS. 6A to 6D, and description thereof is omitted.

Figure 3A:
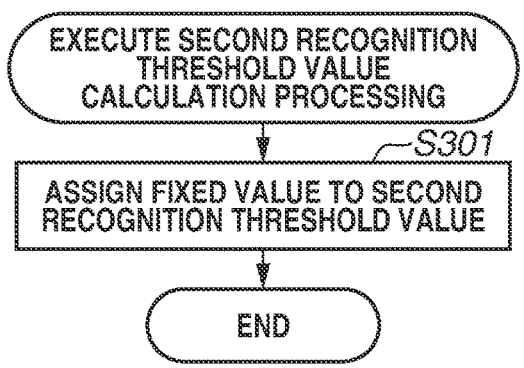
FIGS. 3A, 3B, 3C, and 3D are flowcharts respectively illustrating first, second, third, and fourth patterns of second recognition threshold value calculation processing according to one or more aspects of the present disclosure.

First, the first pattern in which a fixed value determined in advance is set as the second recognition threshold value will be described below with reference to FIGS. 3A and 6A.

If the second recognition threshold value calculation processing in step S215 described above is started, then in step S301 in FIG. 3A, the camera microcomputer 114 reads the fixed value stored in the RAM in the camera microcomputer 114 and sets the read fixed value as the second recognition threshold value, and the process illustrated in FIG. 3A is ended. The fixed value is a value which is smaller than the first recognition threshold value, and a value can be set based on existing findings to reduce misrecognitions to a predetermined ratio, or a value obtained empirically based on preliminary experimental results can be set.

FIG. 6A illustrates an operation example of the case in which the fixed value described above is set to "5" in the first pattern.

In the example illustrated in FIG. 6A, at the timing of the time 0, the face region detected by the face detection circuit 113 is recognized as the face of the registered person by the individual recognition circuit 117. In the present exemplary embodiment, there can be an already-recognized face, or the time 0 can be the timing at which the similarity calculated through the processing in steps S218 to S220 in FIGS. 2 (2A and 2B) exceeds a first recognition threshold value 601 of "9" and the face is recognized for the first time.

During the time period from the time 0 to the time tlost, the recognized face is tracked and the sequence of steps S214 to S215 in FIGS. 2 (2A and 2B) is executed. A curved line 602 in FIG. 6A is a line plotted on a graph to show variations of the similarity from the time 0 to the time tlost. The curved line 602 shows not the variations of the similarity calculated continuously but the variations of the similarity obtained by virtually connecting discrete similarities calculated at predetermined timings by the individual recognition circuit 117. The same applies to other curved lines 604 and 607 described below. As described above, even if individual recognition processing is not executed on the recognized face, the recognized face is determined as the recognized face while it is determined that the recognized face is tracked by the camera microcomputer 114.

Then, if the camera microcomputer 114 loses sight of the recognized face at the time tlost (if the recognized face is lost), the sequence of steps S207 to S212 in FIGS. 2 (2A and 2B) is executed. More specifically, in this case, in step S208, the camera microcomputer 114 sets the second recognition threshold value set in step S301 as the recognition threshold value to be compared with the similarity. In the example illustrated in FIG. 6A, the value "5" is set as a recognition threshold value 603 at the timing of the time tlost.

The time period from the time tlost to the time tfind is an elapsed time after the recognized face is lost at the time tlost as described above. More specifically, in the example illustrated in FIG. 6A, the time period from the time tlost to the time tfind is a time period during which the lost recognized face is not detected in the image-capturing screen (the lost recognized face is not recognized by the individual recognition circuit 117). Thus, for example, if a new face is detected at or after the time tlost, steps S209 to S211 in FIGS. 2 (2A and 2B) are executed on the new detected face.

If a person is detected again at the timing of the time tfind, then in step S210, the individual recognition circuit 117 executes recognition processing. The face of the person detected at this time is the face of a different person from the registered person or the face of the registered person which faces sideways or has a small face size, and the similarity is likely to be low. More specifically, the similarity at this time is more likely to be lower than the second recognition threshold value. On the other hand, at the timing of the time tlost, the recognition threshold value is set to the second the recognition threshold value 603 ("5"), which is smaller than the first recognition threshold value 601 ("9"), so if the similarity is "5" or higher, it is determined that the detected person is the same person as the person of the lost recognized face. Thus, in the case in which the similarity is "5" or higher at the time tfind, time tfind=time trecog, and the lost registered person is recognized again. In this way, the camera microcomputer 114 can promptly execute focus and luminance adjustment processing on the subject of the registered person. After the recognition at the time trecog, the camera microcomputer 114 can return the recognition threshold value to the first recognition threshold value and maintain the first recognition threshold value thereafter until the person is lost or disappears again.

Next, the second pattern will be described below with reference to FIGS. 3B and 6B. In the second pattern, similarity calculation processing is executed at every predetermined timing during the time period from the time 0 to the time tlost, and the similarity calculated at the last timing immediately before the registered person is lost at the time tlost is set as the second recognition threshold value.

Figure 3B:
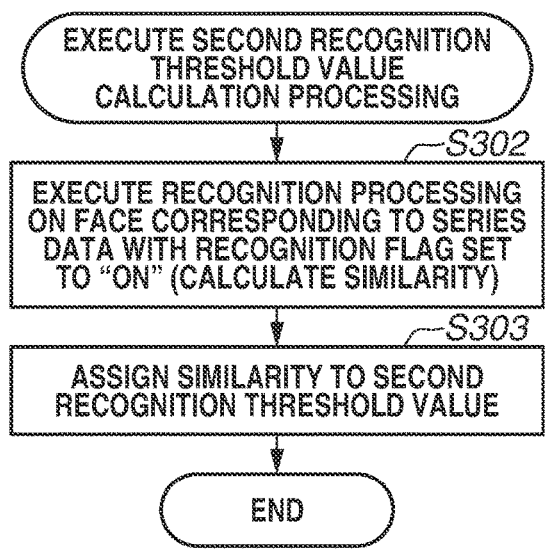

If the second recognition threshold value calculation processing in step S215 is started, then in step S302 in FIG. 3B, the camera microcomputer 114 causes the individual recognition circuit 117 to calculate the similarity. At this time, the individual recognition circuit 117 calculates the similarity by executing recognition processing using the registered face image on the recognized face corresponding to the series data with the recognition flag 407 set to "ON"

in the face data table 401. The similarity calculation processing is executed at every predetermined timing described above.

Next, in step S303, the camera microcomputer 114 sets (assigns) as the second recognition threshold value the value of the similarity calculated at every predetermined timing in step S302. In the present exemplary embodiment, the second recognition threshold value is set to a value which is smaller than the first recognition threshold value, so if the similarity calculated in step S302 is a value which is greater than the first recognition threshold value, the camera microcomputer 114 does not assign the calculated similarity to the second recognition threshold value. Alternatively, the camera microcomputer 114 can assign the similarity calculated in step S302 to the second recognition threshold value only if the calculated similarity is a value which is not greater than a predetermined value with respect to the first recognition threshold value. Further, the second recognition threshold value assigning processing is executed at every predetermined timing as in the case of the similarity calculation processing. Further, the process illustrated in FIG. 3B is not executed if it is determined that the recognized face is lost in step S206 in FIGS. 2 (2A and 2B), so in the case in which the registered person is lost, the value of the similarity calculated at the last timing immediately before the registered person is lost is set as the second recognition threshold value.

Figure 6B:
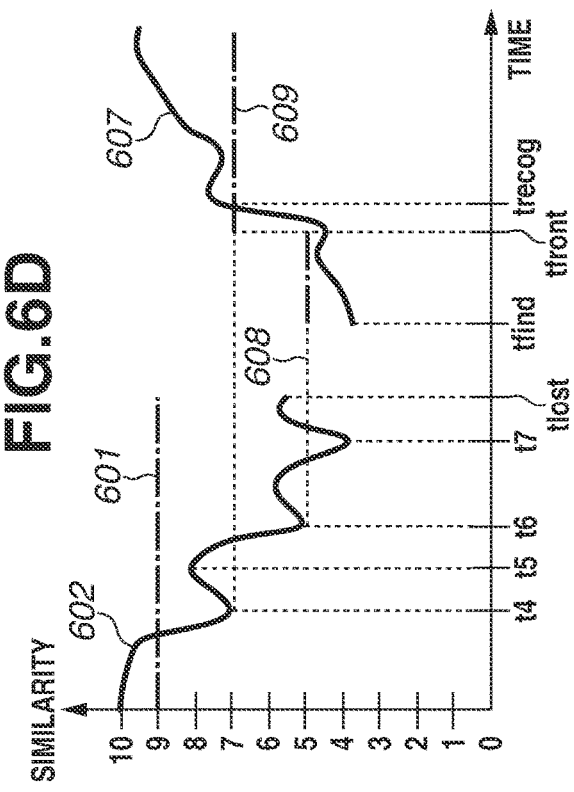

FIG. 6B illustrates an operation example of the case in which the similarity (similarity at time tn) calculated at the last timing immediately before the time tlost among the similarities calculated at the predetermined timings (t1, t2, . . . , tn-1, tn) from the time 0 to the time tlost is "5.5". The processing executed at the timing of the time 0 is similar to that in the case illustrated in FIG. 6A, so description thereof is omitted.

In the example illustrated in FIG. 6B, the time period from the time 0 to the time tlost is a time period during which the recognized face is tracked, and the second recognition threshold value calculation processing is executed at every predetermined timing during the time period. More specifically, the latest similarity obtained by similarity calculation processing executed at fixed time intervals such as the predetermined timings (t1 to tn) illustrated in FIG. 6B is set as the second recognition threshold value by the second recognition threshold value calculation processing. The processing executed at the timing of the time tlost is similar to that in the case illustrated in FIG. 6A, so description thereof is omitted. Further, the time period from the time tlost to the time tfind is similar to that in the case illustrated in FIG. 6A, so description thereof is omitted.

Then, after the registered person is lost at the time tlost, if a person is detected again at the timing of the time tfind, then in step S210, the individual recognition circuit 117 executes recognition processing. The face of the person detected at this time is the face of a different person from the registered person or the face of the registered person which faces sideways or has a small face size, and the similarity is likely to be low. However, in the case of the second pattern of the second recognition threshold value calculation processing, the similarity (value of "5.5" in the example illustrated in FIG. 6B) calculated at the last timing immediately before the time tlost described above is set as a second recognition threshold value 605. Thus, if the similarity obtained by recognition processing executed at the timing of the time tfind is greater than the second recognition threshold value 605 ("5.5"), it can be determined that the detected face is the face of the same person as the person of the lost recognized face.

If, for example, the time period from the time tlost to the time tfind is relatively short, the face is more likely to appear in a state which is similar to the face state (face orientation, face size, etc.) at the time when the face is lost. Thus, in the case in which the similarity calculated by the individual recognition processing executed at the time to immediately before the time tlost is set as the second recognition threshold value 605, it is considered that the face detected again is recognized with ease and misrecognitions of the face of a person other than the registered person are reduced.

As described above, the second pattern of the second recognition threshold value calculation processing makes it possible to recognize the lost registered person again at the time trecog which is substantially the same as the time tfind. In this way, the camera microcomputer 114 can promptly execute focus and luminance adjustment processing on the subject of the registered person. After the recognition at the time trecog, the camera microcomputer 114 can return the recognition threshold value to the first recognition threshold value and maintain the first recognition threshold value thereafter until the person is lost or disappears again.

Next, the third pattern will be described below with reference to FIGS. 3C and 6C. In the third pattern, similarity calculation processing is executed at every predetermined timing from the time 0 to the time tlost, and the smallest value among the similarities calculated by recognition processing executed while the recognized face is tracked is set as the second recognition threshold value. Only a part of the flowchart in FIG. 3C that is different from that of the flowchart in FIG. 3B will be described below.

Figure 3C:
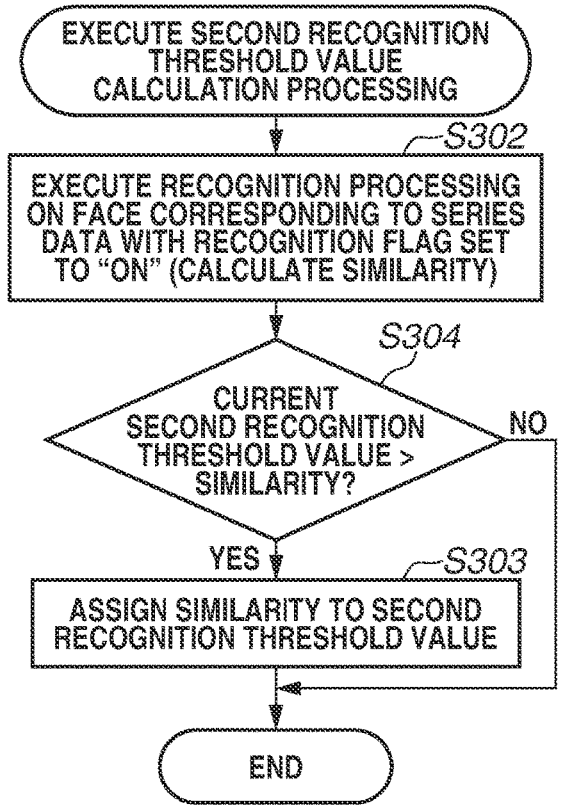

In step S304 in FIG. 3C, the camera microcomputer 114 compares the similarity calculated by the individual recognition processing executed in step S302 with the value which is currently set as the second recognition threshold value, and determines whether the calculated similarity is smaller than the currently-set second recognition threshold value. As a result of the comparison in step S304, if the camera microcomputer 114 determines that the calculated similarity is smaller than the currently-set second recognition threshold value (YES in step S304), the processing proceeds to step S303. In step S303, the calculated similarity is assigned to the second recognition threshold value. On the other hand, in step S304, if the camera microcomputer 114 determines that the currently-set second recognition threshold value is not greater than the calculated similarity (NO in step S304), the calculated similarity is not assigned to the second recognition threshold value, and the process illustrated in FIG. 3C is ended. The camera microcomputer 114 is set the second recognition threshold value to a value which is smaller than the first recognition threshold value, so if the calculated similarity is greater than the first recognition threshold value ("9"), the similarity is not assigned to the second recognition threshold value. Further, in the third pattern, the similarity calculation processing and the second recognition threshold value assigning processing are executed at every predetermined timing as in the second pattern described above.

Figure 6C:
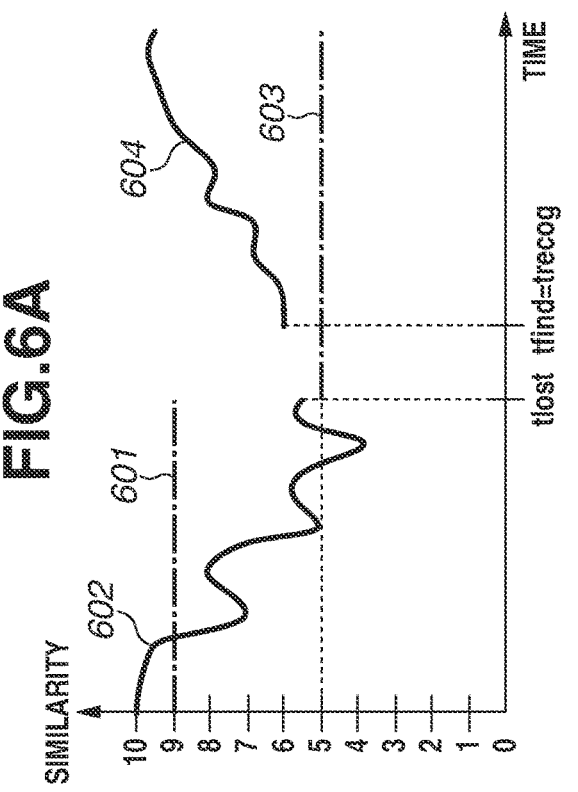

FIG. 6C illustrates an operation example of the case in which the smallest value of the similarity among the similarities calculated at the predetermined timings (t1, t2, tn-1, tn) from the time 0 to the time tlost is calculated at the timing of the time tn-1 and the similarity is "4". The processing executed at the timing of the time 0 is similar to that in the case illustrated in FIG. 6A, so description thereof is omitted.

Further, the time period from the time 0 to the time tlost is similar to that in the case illustrated in FIG. 6B, so description thereof is omitted. Further, the processing executed at the time tlost is similar to that in the cases illustrated in FIGS. 6A and 6B, so description thereof is omitted. Further, the time period from the time tlost to the time tfind is similar to that in the case illustrated in FIGS. 6A and 6B, so description thereof is omitted.

In the example illustrated in FIG. 6C, if a person is detected again at the timing of the time tfind, then in step S210, the individual recognition circuit 117 executes recognition processing. The face of the person detected at this time is the face of a different person from the registered person or the face of the registered person which faces sideways or has a small face size, and the similarity is likely to be low, as described above. However, in the case of the third pattern of the second recognition threshold value calculation processing, the smallest value of the similarity ("4") among the similarities calculated from the time 0 to the time tlost is set as the second recognition threshold value 606. Thus, if the similarity obtained by the recognition processing executed at the timing of the time tfind is greater than the second recognition threshold value 606 ("4"), it can be determined that the detected face is of the same person as the person of the lost recognized face.

From the recognition processing executed from the time t1 to the time tn-1 it is known that the similarity of the lost face can decrease to the smallest similarity calculated during the tracking depending on the state of the face such as the face orientation and face size. Thus, it is considered that if the smallest value of the similarity among the similarities calculated by the individual recognition processing executed from the time t1 to the time tn-1 is set as the second recognition threshold value, the face detected again is recognized with ease even if the state (face orientation, face size, etc.) of the detected face is worse than the face state at the time when the face is lost.

As described above, the third pattern of the second recognition threshold value calculation processing makes it possible to recognize the lost registered person again at the time trecog which is substantially the same as the time tfind. In this way, the camera microcomputer 114 can promptly execute focus and luminance adjustment processing on the subject of the registered person. After the recognition at the time trecog, the camera microcomputer 114 can return the recognition threshold value to the first recognition threshold value and maintain the first recognition threshold value thereafter until the person is lost or disappears again.

Next, the fourth pattern will be described below with reference to FIGS. 3D and 6D. In the fourth pattern, recognition processing is executed at predetermined timings from the time 0 to the time tlost, and the similarity obtained by recognition processing executed during the recognized face tracking is stored as table data and set as the second recognition threshold value.

Figure 3D:
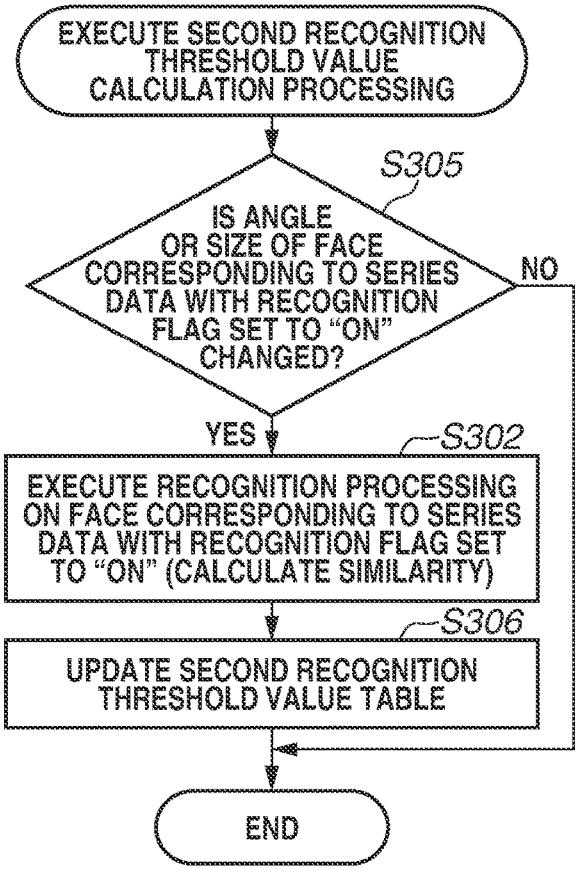

In step S305 in FIG. 3D, the camera microcomputer 114 determines whether there is a change in face size information and angle information among the face information output by the face detection circuit 113 from the previously output face information. In the present exemplary embodiment, for example, whether there is a change in the face information is determined based on whether the face size is changed from the state "large", "medium", or "small" or whether the face angle is changed from "0 degrees", "45 degrees", or "90 degrees". The camera microcomputer 114 generates similarity table data corresponding to the combination of face size and face angle as second recognition threshold value table data and stores the similarity table data in the RAM in the camera microcomputer 114, as illustrated in FIG. 5. The size information and angle information based on which whether there is a change is determined are not limited to the sizes and angles described above and can be a size and an angle by which the similarity of individual recognition is changed significantly, or the size and angle can be extracted by preliminary examination and set. Then, in step S305, if the camera microcomputer 114 determines that there is a change in the face information from the previous face information (YES in step S305), the processing proceeds to step S302. On the other hand, if the camera microcomputer 114 determines that there is no change (NO in step S305), the process illustrated in FIG. 3D is ended. Step S302 is similar to that in the process illustrated in FIG. 3B, so description thereof is omitted. In the case illustrated in FIG. 3D, after step S302, the processing proceeds to step S306 described below.

The processing executed in step S305 can be the processing in which the second recognition threshold value calculation processing is executed at every predetermined timing (fixed time intervals) as described above, but in the fourth pattern, the processing is executed only at the timing when there is a change in the face information so that the processing load is reduced. Thus, in the description below with reference to FIG. 6D, the case in which the processing is executed only if there is a change in the face information is described as an example.

In step S306, the camera microcomputer 114 updates the second recognition threshold value in the corresponding cell in the second recognition threshold value table in FIG. 5 with the similarity calculated by the recognition processing in step S302 with regard to the combination of the face size information and face angle information acquired by the processing in step S305. Then, after step S306, the process illustrated in FIG. 3D is ended. The camera microcomputer 114 sets as the second recognition threshold value a value which is smaller than the first recognition threshold value, so if the calculated similarity is greater than the first recognition threshold value, the second recognition threshold value is not updated with the calculated similarity. Alternatively, the camera microcomputer 114 can update the second recognition threshold value only if the calculated similarity is a value which is not greater than a predetermined value with respect to the first recognition threshold value. Further, the camera microcomputer 114 can set a pre-fixed value by preliminary examination with respect to the threshold value corresponding to the cell of the combination of size and angle on which recognition processing is not executed in the second recognition threshold value table in FIG. 5. In this case, only the value of the cell corresponding to the combination of face size and face angle on which recognition processing is executed is updated with the calculated similarity. Further, the camera microcomputer 114 can store an offset value between the cells in advance and can update the values as needed based on the similarity calculated by the recognition processing and the offset value.

Figure 6D:
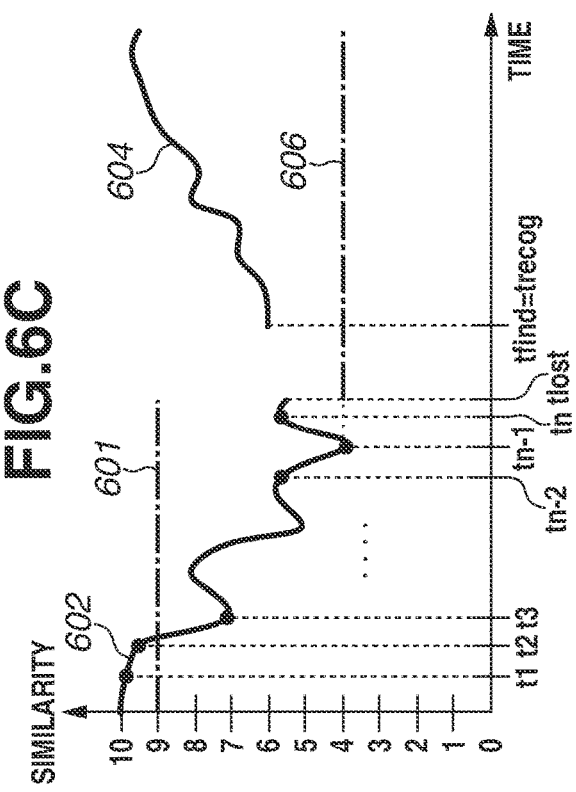

FIG. 6D illustrates an operation example of the fourth pattern in which the similarity obtained by the recognition processing executed at the timing at which the face information is changed is set as the second recognition threshold value table. The processing executed at the timing of the time 0 is similar to that in the case illustrated in FIG. 6A, so description thereof is omitted.

In FIG. 6D, the recognized face is tracked during the time period from the time 0 to the time tlost, and in this time period, the second recognition threshold value calculation processing is executed at the timing at which there is a change in the face information from the face detection circuit 113. In the example illustrated in FIG. 6D, a change in the face information is detected at the timings of time t4 to time t7, and the second recognition threshold value calculation processing is executed at the timings to obtain similarities, and the similarities are assigned as the second recognition threshold value to the recognition threshold value table illustrated in FIG. 5.

The following describes operations executed at the timings of the time t4 to the time t7 in FIG. 6D on the assumption that the state of the recognition threshold value table in FIG. 5 is the state of the table at the timing of the time tlost.

At the time 0, the face size is "medium", and the face angle is "0 degrees". Further, as illustrated in FIG. 6D, the similarity of the face at the time 0 at which the face size is "medium" and the face angle is "0 degrees" is, for example, "10". The similarity of "10" at this time is greater than the first recognition threshold value 601 of "9" described above, so the value of the corresponding cell in the recognition threshold value table is not updated.

Next, at the time t4, the face size remains "medium", whereas the face angle is changed from "0 degrees" to "45 degrees". In this case, since the face information is changed, the individual recognition circuit 117 executes recognition processing on the face, calculates the similarity of "7", and notifies the camera microcomputer 114 of the calculated similarity. In this way, the camera microcomputer 114 assigns the acquired similarity of "7" as the second recognition threshold value to the corresponding cell (cell with the face size "medium" and face angle "45 degrees") in the recognition threshold value table.

Next, at the time t5, the face size is changed from "medium" to "large", whereas the face angle remains "45 degrees". In this case, since the face information is changed, the individual recognition circuit 117 executes recognition processing on the face, calculates the similarity, and notifies the camera microcomputer 114 of the calculated similarity. Next, the camera microcomputer 114 assigns the acquired similarity of "8" as the second recognition threshold value to the corresponding cell (cell with the face size "large" and face angle "45 degrees") in the recognition threshold value table.

Next, at the time t6, the face size remains "large", whereas the face angle is changed from "45 degrees" to "90 degrees". In this case, since the face information is changed, the individual recognition circuit 117 executes recognition processing on the face, calculates the similarity of "5", and notifies the camera microcomputer 114 of the calculated similarity. In this way, the camera microcomputer 114 assigns the acquired similarity of "5" as the second recognition threshold value to the corresponding cell (cell with the face size "large" and face angle "90 degrees") in the recognition threshold value table.

Next, at the time t7, the face size is changed from "large" to "medium", whereas the face angle remains "90 degrees". In this case, since the face information is changed, the individual recognition circuit 117 executes recognition processing on the face, calculates the similarity of "4", and notifies the camera microcomputer 114 of the calculated similarity. In this way, the camera microcomputer 114 assigns the acquired similarity of "4" as the second recognition threshold value to the corresponding cell (cell with the face size "medium" and face angle "90 degrees") in the recognition threshold value table.

The foregoing is the second recognition threshold value calculation processing executed from the time 0 to the time tlost. As described above, a predetermined value is assigned in advance to the values in the cells that are not updated in the above-described operation example.

Next, the time tlost and the time period from the time tlost to the time tfind is a time period during which the lost recognized face does not appear in the image-capturing screen, and the processing executed on a new face detected during the time period is similar to the processing at and after the time tfind described above, so description thereof is omitted.

Next, if a person is detected again at the timing of the time tfind, then in step S210, the individual recognition circuit 117 executes recognition processing to calculate the similarity. The face of the person detected at this time is the face of a different person from the registered person or the face of the registered person which faces sideways or has a small face size, and the similarity is likely to be low, as described above. In the fourth pattern, the camera microcomputer 114 acquires the second recognition threshold value set to the cell corresponding to the face information (face size and face angle) about the new detected face from the recognition threshold value table described above based on the face information. Then, the camera microcomputer 114 compares the similarity calculated by the individual recognition circuit 117 with the second recognition threshold value in the corresponding cell in the recognition threshold value table.

The face information acquired at the time tfind in FIG. 6D is the face size "large" and the face angle "90 degrees". In this case, the camera microcomputer 114 sets as a second recognition threshold value 608 the value of "5" set to the cell with the combination of the face size "large" and face angle "90 degrees" from the recognition threshold value table. In the case illustrated in FIG. 6D, the calculated similarity is below the second recognition threshold value of "5" at the time tfind because, for example, the face state other than the face size and face angle is unfavorable, etc. A possible reason for the unfavorable face state is, for example, the case in which the brightness of the face and facial expressions differ significantly. Thus, in the case illustrated in FIG. 6D, the camera microcomputer 114 is unable to determine that the lost face appears again at the time tfind.

Next, the similarity at and after the time tfind is, for example, as illustrated by a curved line 607 in FIG. 6D. When the curved line 607 is below the second recognition threshold value 608, the camera microcomputer 114 cannot determine that the lost face appears again.

At time tfront, if the face size is changed from "large" to "medium" and the face angle is changed from "90 degrees" to "45 degrees" and the face information is input from the individual recognition circuit 117 to the camera microcomputer 114, the camera microcomputer 114 sets as a second recognition threshold value 609 the value of "7" set to the cell with the face size "medium" and face angle "45 degrees" in the recognition threshold value table. Further, during the time period from the time tfront to the time trecog, the camera microcomputer 114 notifies the individual recognition circuit 117 of an instruction to execute recognition processing on a face which is not recognized.

Then, at the timing of the time trecog, if the similarity obtained by the recognition processing executed by the individual recognition circuit 117 exceeds the second recognition threshold value 609 of "7", the camera microcomputer 114 determines that the face for which the similarity is calculated by the recognition processing executed at the time trecog is the face of the lost recognized person.

As described above, in the fourth pattern of the second recognition threshold value calculation processing, the similarities calculated by the individual recognition processing executed at the timings of the time t4 to the time t7 at which the face information is changed are stored as the second recognition threshold value in the recognition threshold value table. Then, in the recognition processing, the second recognition threshold value corresponding to the face information is set from the recognition threshold value table. In this way, in the fourth pattern of the second recognition threshold value calculation processing, the face detected again is recognized with ease and misrecognitions of the face of a person other than the registered person are reduced. Thus, the camera microcomputer 114 can promptly execute focus and luminance adjustment processing on the subject of the registered person. After the recognition at the time trecog, the camera microcomputer 114 can return the recognition threshold value to the first recognition threshold value and maintain the first recognition threshold value thereafter until the person is lost or disappears again.

<Example of Second Recognition Threshold Value Setting (Case in which Second Recognition Threshold Value is Changed According to Position)>

Next, an example of the threshold value setting in positions in the image-capturing screen with regard to the second recognition threshold value set during the time period from the time tlost to the time trecog described above will be described below with reference to FIGS. 7A to 7D.

On the horizontal axis in each of FIGS. 7A to 7D, a center of the axis is defined as a central area of the screen, the left edge of the axis as a left screen edge, and the right edge of the axis as a right screen edge. Further, the vertical axis in each of FIGS. 7A to 7D represents the second recognition threshold value described above. The examples illustrated in FIGS. 7A to 7D will be described based on the first pattern described above with reference in FIG. 6A in which the fixed value of "5" is set. Values on a dot-and-dash polygonal line in each of FIGS. 7A to 7D show the second recognition threshold value set according to positions in the screen as described in the present exemplary embodiment. While an example of the horizontal direction of the screen is described with reference to FIGS. 7A to 7D, the present exemplary embodiment is also applicable to the vertical direction of the screen and other directions.

FIG. 7A illustrates an example of the second recognition threshold value set when the camera microcomputer 114 detects a panning operation (operation performed by an image capturing person to swing the video camera 10 in the horizontal direction) in the left direction of the screen. In FIG. 7A, from the left of the screen to a position ppan1, the fixed value of "5" is set as the second recognition threshold value, and from the position ppan1 to a position ppan2, values linearly connecting the fixed value of "5" and the value of "9" corresponding to the first recognition threshold value are set as the second recognition threshold value. Further, from the position ppan2 to the right of the screen, the value of "9" corresponding to the first recognition threshold value is set as the second recognition threshold value. In the example illustrated in FIG. 7A, in the case in which the video camera 10 is swung by panning, small values are set as the second recognition threshold value in positions in the panning direction, whereas large values are set as the second recognition threshold value in positions in the opposite direction to the panning direction, as shown by a polygonal line 710.

In the case in which the image capturing person (user) is panning the video camera 10, the main subject is more likely to be in the panning direction, and the main subject, i.e., the lost recognized face, is more likely to be detected in the panning direction. On the other hand, a subject detected from the right of the screen in the opposite direction to the panning direction is less likely to be the main subject the image capturing person is looking for. Thus, in the example illustrated in FIG. 7A, the second recognition threshold value is set low with respect to the face detected in the panning direction, whereas the second recognition threshold value is set high with respect to the face detected in the opposite direction to the panning direction. Thus, in the example illustrated in FIG. 7A, when the registered subject which is lost at the time tlost is detected again, the timing to recognize (time trecog) is expedited. Further, in the case in which a subject other than the registered subject is detected, misrecognitions are prevented.

Further, in the example illustrated in FIG. 7A, the second recognition threshold value is set to the fixed value of "5" with respect to the left screen edge and the position ppan1 in which the second recognition threshold value is changed from the fixed value of "5" is set to a position located at a predetermined distance from the left of the screen for first and second reasons described below.

The first reason is that the size of the detected face region is taken into consideration and it is considered that the position of the center of the detected face region is always the position of the half of the horizontal size of the face region. Thus, the camera microcomputer 114 can set the position ppan1 towards the right side of the screen as the size of the detected face region increases.

The second reason is that it is considered that the position in which the face region is detected is likely to be further shifted towards the center when the panning amount is increased. Thus, the camera microcomputer 114 can set the position ppan1 towards the right side of the screen as the detected panning amount increases.

Further, while the second recognition threshold value is continuously changed linearly from the position ppan1 to the position ppan2 in the example illustrated in FIG. 7A, the second recognition threshold value can be changed non-linearly or discretely as long as the second recognition threshold value is monotonically increased.

While the example in which the second recognition threshold value is set according to positions in the panning direction is illustrated in FIG. 7A, the second recognition threshold value setting with respect to the tilting operation in which the image capturing person swings the video camera 10 in the vertical direction can be performed based on the same concept. Further, the second recognition threshold value setting can be performed based on one of or both of the panning and the tilting.

FIG. 7B illustrates an example of the setting of the second recognition threshold value at the time of wide detection at which the driving of the zoom lens 102 in the wide direction is detected by the camera microcomputer 114. In FIG. 7B, from the left of the screen to a position pwide1, the fixed value of "5" is set as the second recognition threshold value, and from the position pwide1 to a position pwide2, values linearly connecting the fixed value of "5" and the value of "9" corresponding to the first recognition threshold value are set as the second recognition threshold value. Further, from the position pwide2 to a position pwide3, the value of "9" corresponding to the first recognition threshold value is set as the second recognition threshold value, and from the position pwide3 to a position pwide4, values linearly connecting the value of "9" corresponding to the first recognition threshold value and the fixed value of "5" are set as the second recognition threshold value. Further, from the position pwide4 to the right of the screen, the fixed value of "5" is set as the second recognition threshold value. In the example illustrated in FIG. 7B, in the case in which the zoom lens 102 driven in the wide direction, the second recognition threshold value is set low in positions near the edge of the screen, whereas the second recognition threshold value is set high in positions near the screen central area, as shown by a polygonal line 702.

In the case in which the image capturing person operates the zoom lens 102 of the video camera 10 in the wide direction, the main subject is more likely to be detected from the peripheral area of the screen. On the other hand, in the case in which the zoom lens 102 is operated in the wide direction, the subject detected near the center of the screen is less likely to be the main subject the image capturing person is looking for. Thus, in the example illustrated in FIG. 7B, in the case in which the zoom lens 102 is operated in the wide direction, the second recognition threshold value is set low with respect to the face detected in the peripheral area of the screen, whereas the second recognition threshold value is set high with respect to the face detected near the central area of the screen. In this way, when the registered subject which is lost at the time tlost is detected again, the timing to recognize (time trecog) is expedited. Further, in the case in which a subject other than the registered subject is detected, misrecognitions are prevented.

Further, in FIG. 7B, the second recognition threshold value is set to the fixed value of "5" with respect to the respective screen edges and the positions pwide1 and pwide4 in which the second recognition threshold value is changed from the fixed value of "5" are each set to a position located at a predetermined distance from the screen edge for third and fourth reasons described below.

The third reason is that the size of the detected face region is taken into consideration, as in FIG. 7A, and the position of the center of the face region is always the position of the half of the horizontal size of the face region. Thus, the camera microcomputer 114 can set the positions pwide1 and pwide4 towards the right side of the screen as the size of the detected face region increases.

The fourth reason is that the detected position is further shifted towards the center due to an increase in the zoom driving speed of the zooming driving device 115. Thus, the camera microcomputer 114 can set the positions pwide1 and pwide4 towards the screen central area as the zoom driving speed increases.

Further, while the second recognition threshold value is continuously changed linearly from the position pwide1 to the position pwide2 and from the position pwide3 to the position pwide4 in the example illustrated in FIG. 7B, the second recognition threshold value can be changed non-linearly or discretely as long as the second recognition threshold value is monotonically increased.

FIG. 7C illustrates an example of the second recognition threshold value setting in the case in which the position in which the recognized face is lost is a position plost3. In FIG. 7C, each value on a polygonal line 703 shows the second recognition threshold value set according to positions in which the face is lost. In FIG. 7C, from the left of the screen to a position plost1, the value of "9" corresponding to the first recognition threshold value is set as the second recognition threshold value, and from the position plost1 to a position plost2, values linearly connecting the value of "9" corresponding to the first recognition threshold value and the fixed value of "5" are set as the second recognition threshold value. Further, from the position plost2 to a position plost4, the fixed value "5" is set as the second recognition threshold value, and from the position plost4 to a position plost5, values linearly connecting the fixed value of "5" and the value of "9" corresponding to the first recognition threshold value are set as the second recognition threshold value. Further, from the position plost5 to the right of the screen, the value of "9" corresponding to the first recognition threshold value is set as the second recognition threshold value. In the example illustrated in FIG. 7C, as shown by the polygonal line 703, in the case in which the position in which the recognized face is lost is the position plost3, the second recognition threshold value is set low in positions near the position plost3, whereas the second recognition threshold value is set high in positions far from the position plost3.

Meanwhile, if the image capturing person does not perform panning or zooming of the video camera 10, the main subject, i.e., the person of the lost recognized face, is likely to still remain near the area where sight of the main subject is lost, and the recognized face of the person is more likely to appear again in the lost position. On the other hand, the subject detected in a position far from the position in which the recognized face is lost is less likely to be the recognized face. Thus, in FIG. 7C, the second recognition threshold value is set low with respect to the face detected near the position in which the recognized face is lost, whereas the second recognition threshold value is set high with respect to the face detected in a position far from the position in which the recognized face is lost. In this way, when the registered subject which is lost at the time tlost is detected again, the timing to recognize (time trecog) is expedited. Further, in the case in which a subject other than the registered subject is detected, misrecognitions are prevented.

Further, in FIG. 7C, the positions plost2 and plost4 are each set to a position located at a predetermined distance from the position plost3 for fifth and sixth reasons described below.

The fifth reason is that the size of the detected face region is taken into consideration, as in FIGS. 7A and 7B, and the position of the center of the face region is always the position of the half of the horizontal size of the face region. Thus, the positions plost2 and plost4 can be set farther from the position plost3 as the size of the detected face region increases.

The sixth reason is that the detection position can be shifted from the position plost3 in the direction of movement as the amount of movement of the person immediately before the recognized face is lost increases. Thus, the positions plost2 and plost4 can be set further in the direction of movement of the person of the face immediately before the face is lost as the amount of movement of the person of the face immediately before the face is lost increases. In other words, the positions plost1 to plost4 do not have to be symmetrical with respect to the position plost3. Further, while the second recognition threshold value is continuously changed linearly from the position plost1 to the position plost2 and from the position plost4 to the position plost5, the second recognition threshold value can be changed non-linearly or discretely as long as the second recognition threshold value is monotonically increased.

FIG. 7D illustrates an example of the second recognition threshold value setting at the time of tele-detection in which the driving of the zoom lens 102 in the tele-direction is detected by the camera microcomputer 114. In FIG. 7D, from the left of the screen to a position ptele1, the value of "9" corresponding to the first recognition threshold value is set as the second recognition threshold value, and from the position ptele1 to a position ptele2, values linearly connecting the value of "9" corresponding to the first recognition threshold value and the fixed value of "5" are set as the second recognition threshold value. Further, from the position ptele2 to a position ptele3, the fixed value of "5" is set as the second recognition threshold value, and from the position ptele3 to a position ptele4, values linearly connecting the fixed value of "5" and the value of "9" corresponding to the first recognition threshold value are set as the second recognition threshold value. Further, from the position ptele4 to the right of the screen, the value of "9" corresponding to the first recognition threshold value is set as the second recognition threshold value. In the example illustrated in FIG. 7D, in the case in which the zoom lens 102 is driven in the tele-direction, the second recognition threshold value is set low with respect to positions near the screen central area, whereas the second recognition threshold value is set high with respect to positions near the screen edges, as shown by a polygonal line 704.

In the case in which the image capturing person operates the zoom lens 102 of the video camera 10 in the tele-direction, the main subject, i.e., the recognized face, is more likely to be detected in the screen central area. On the other hand, the subject detected in the peripheral area of the screen is moved out of the screen by the zooming in the tele-direction, so the subject is less likely to be the main subject the image capturing person is looking for. Thus, as illustrated in FIG. 7D, the recognition threshold value is set low with respect to the face detected near the screen central area, whereas the recognition threshold value is set high with respect to the face detected in the peripheral area of the screen. In this way, when the registered subject which is lost at the time tlost is detected again, the timing to recognize (time trecog) is expedited. Further, in the case in which a subject other than the registered subject is detected, misrecognitions are prevented.

Further, in FIG. 7D, the positions ptele1 and ptele4 in which the second recognition threshold value near the peripheral area of the screen is changed from the value of "9" corresponding to the first recognition threshold value are each set to a position located at a predetermined distance from the screen edge for seventh and eighth reasons described below.

The seventh reason is that the size of the detected face region is taken into consideration, as in FIGS. 7A, 7B, and 7C, and the position of the center of the face region is always the position of the half of the horizontal size of the face region. Thus, if, for example, the zoom ratio is twofold with respect to the face size and zoom ratio (onefold) at the time when the recognized face is lost, a doubled value with respect to the face size at the time when the face is lost can be set as the positions ptele2 and ptele3.

The eighth reason is that the speed at which the face in the screen peripheral area is moved out of the screen increases as the zoom driving speed of the video camera 10 increases. Thus, the positions ptele1 to ptele4 can be set further in the screen central area as the zoom driving speed increases.

Further, while the second recognition threshold value is continuously changed linearly from the position ptele1 to the position ptele2 and from the position ptele3 to the position ptele4, the second recognition threshold value can be changed non-linearly or discretely as long as the second recognition threshold value is monotonically increased.

<Example of Second Recognition Threshold Value Setting (Case in which Second Recognition Threshold Value is Changed According to Time)>

Next, an example of temporal changes in the second recognition threshold value set during the time period from the time tlost to the time trecog will be described below with reference to FIGS. 8A to 8D.

FIGS. 8A to 8D illustrate an example of changes in the second recognition threshold value during the time period from the time tlost at which the recognized face is lost to the time before the time trecog at which the face can be recognized again. The horizontal axis in each of FIGS. 8A to 8D represents time, and the origin is the time tlost at which sight of the recognized subject (face) is lost. Further, the vertical axis in each of FIGS. 8A to 8D represents the second recognition threshold value described above. The examples illustrated in FIGS. 8A to 8D will be described based on the first pattern described above with reference in FIG. 6A in which the fixed value of "5" is set. Values on dot-and-dash lines 801 to 804 in FIGS. 8A to 8D show the second recognition threshold value set according to time as described in the present exemplary embodiment.

Figure 8A:
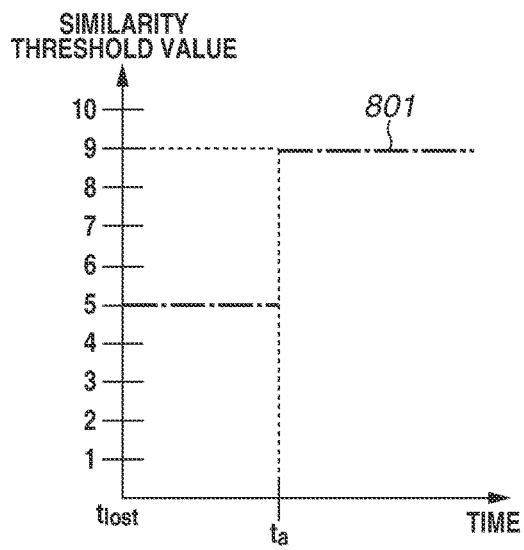
FIGS. 8A, 8B, 8C, and 8D respectively illustrate first, second, third, and fourth patterns of an example of the second recognition threshold value setting according to temporal changes.

FIG. 8A illustrates an example in which the second recognition threshold value is set to the fixed value of "5" at the time tlost and thereafter set to the value of "9" corresponding to the first recognition threshold value at time ta. The dot-and-dash line 801 in FIG. 8A shows the second recognition threshold value.

Figure 8B:
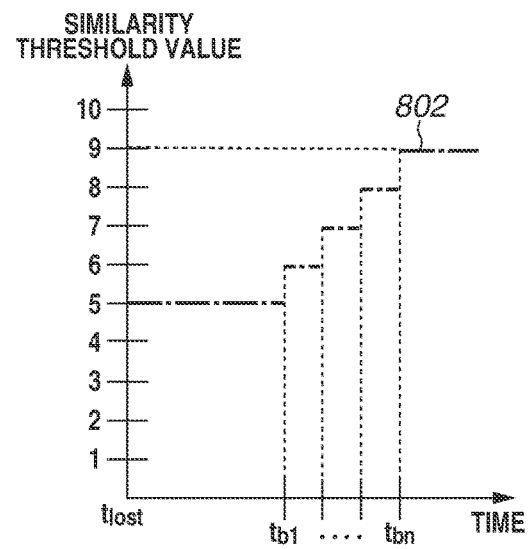

FIG. 8B illustrates an example in which the second recognition threshold value is set to the fixed value of "5" at the time tlost and thereafter set to the value of "6" at the timing of the time tb1 and then the second recognition threshold value is set step by step so as to reach the value of "9" corresponding to the first recognition threshold value at the timing of the time tbn. Values on the dot-and-dash line 802 in FIG. 8B show the second recognition threshold value set according to time. While FIG. 8B illustrates the example in which the second recognition threshold value is changed in four stages, the number of stages of the change can be any number.

Figure 8C:
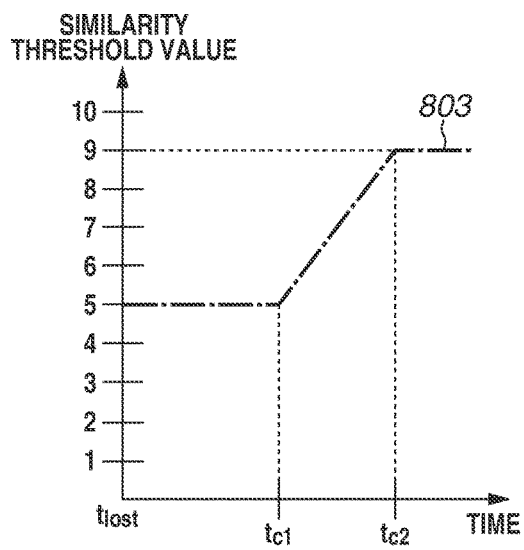

FIG. 8C illustrates an example in which the second recognition threshold value is set to the fixed value of "5" at the time tlost and then the second recognition threshold value is increased linearly from time tc1 to time tc2. Values on the dot-and-dash line 803 in FIG. 8C show the second recognition threshold value set according to time.

Figure 8D:
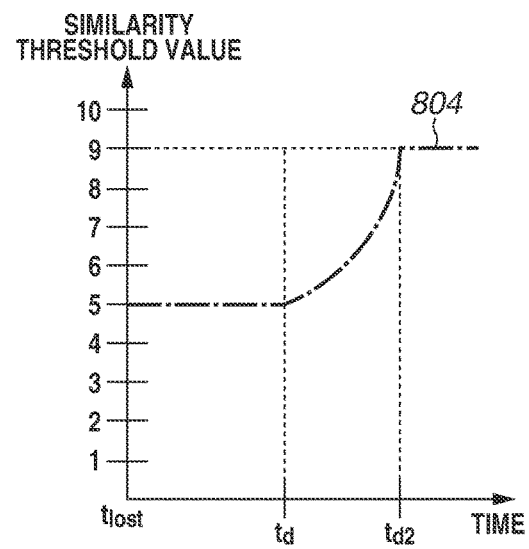

FIG. 8D illustrates an example in which the second recognition threshold value is set to the fixed value of "5" at the time tlost and then the second recognition threshold value is increased non-linearly from time td1 to time td2. Values on the dot-and-dash line 804 in FIG. 8D show the second recognition threshold value set according to time.

The time ta, the time tb1 to the time tbn, the time tc1, the time tc2, the time td1, and the time td2 are values (time) which are each compared with the elapsed time indicated by the lost counter value described above.

Further, in the present exemplary embodiment, the threshold value setting according to position as illustrated in FIGS. 7A to 7D and the threshold value setting according to time as illustrated in FIGS. 8A to 8D can be combined together to execute the second recognition threshold value setting.

A case in which the second recognition threshold value setting illustrated in FIG. 7A and the second recognition threshold value setting illustrated in FIG. 8C are executed in combination will be described below as an example. In this example, the second recognition threshold value in the positions from the left of the screen in FIG. 7A to the position ppan2 can start increasing monotonically at the time tc1 and the monotonic increase can be ended at time tc2 to set the second recognition threshold value to the value of "9" corresponding to the first recognition threshold value. In this example, the lower the threshold value set to the position at the time tlost is, the more the amount of increase of the threshold value per unit time becomes, but the amount of increase of the threshold value per unit time can be set constant.

The recognition threshold value according to screen positions described above can be determined based on the position of the center of the face detected by the face detection circuit 113, can be the recognition threshold value which is a majority in the face region based on the position of the center of the face and the face size, or can be the mean value of the recognition threshold values set in the face region.

As described above, in the present exemplary embodiment, the threshold value for use in determining whether a person is the same person as a person registered in a video camera as a result of individual recognition processing in the individual recognition control is changed according to the image capturing situation to reduce the time needed to determine that the person is the registered person. More specifically, in the present exemplary embodiment, even if it is difficult to recognize a desired person due to a change in facial expressions, face orientation, etc., the person can be recognized as the registered person at an early timing. Thus, in the present exemplary embodiment, AF control and AE control can be executed on the desired person at an early timing so that video images which are more reflective of user intention are captured.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2017-007529, filed Jan. 19, 2017, which is hereby incorporated by reference herein in its entirety.

What is claimed is:

1. An image processing apparatus comprising:
   a detection circuit configured to detect a predetermined subject region from a video signal;
   a recognition circuit configured to perform recognition processing on the subject region detected by the detection circuit, based on a comparison of a similarity between feature information extracted from the subject region and registered feature information with a predetermined threshold value;
   a tracking circuit configured to track a recognized subject region that has been recognized by the recognition circuit; and
   a setting circuit configured to set the predetermined threshold value,
   wherein the setting circuit stores information about the recognized subject region tracked by the tracking circuit,
   wherein, in a case where the tracking circuit does not track the recognized subject region and the setting circuit does not store recognition information about a first subject, the setting circuit sets a first threshold value as the predetermined threshold value for the first subject, and
   wherein, in a case where the tracking circuit does not track the recognized subject region and the setting circuit stores the recognition information about the first subject, the setting circuit sets, as the predetermined threshold value for the first subject, a second threshold value that is lower than the first threshold value.

2. The image processing apparatus according to claim 1, wherein, in a case where the similarity between the feature information extracted from the subject region and the registered feature information is greater than the predetermined threshold value, the recognition circuit determines that the predetermined subject region is recognized.

3. The image processing apparatus according to claim 1, wherein, in a case where a time period during which the recognized subject region is unable to be recognized again from when the tracking circuit becomes unable to track the recognized subject region continues for a predetermined time period or longer, the setting circuit deletes recognition information about the recognized subject region.

4. The image processing apparatus according to claim 1, wherein the setting circuit sets, as the predetermined threshold value, a value that is greater than the second threshold value according to a time that passes from when the tracking circuit becomes unable to track the recognized subject region.

5. The image processing apparatus according to claim 4, wherein, when a predetermined time passes from when the tracking circuit becomes unable to track the recognized subject region, the setting circuit changes the predetermined threshold value from the second threshold value to the first threshold value.

6. The image processing apparatus according to claim 4, wherein the setting circuit increases the predetermined threshold value step by step from the second threshold value from when the tracking circuit becomes unable to track the recognized subject region until a predetermined time passes.

7. The image processing apparatus according to claim 4, wherein the setting circuit increases the predetermined threshold value linearly from the second threshold value from when the tracking circuit becomes unable to track the recognized subject region until a predetermined time passes.

8. The image processing apparatus according to claim 4, wherein the setting circuit increases the predetermined threshold value non-linearly from the second threshold value from when the tracking circuit becomes unable to track the recognized subject region until a predetermined time passes.

9. The image processing apparatus according to claim 1,
wherein, in a case where the tracking circuit tracks the recognized subject region, the recognition circuit calculates the similarity at predetermined timing, and
wherein the setting circuit sets, as the second threshold value, a value of the similarity calculated at the last timing among the similarities calculated at the predetermined timings.

10. The image processing apparatus according to claim 9,
wherein the detection circuit determines whether at least one of size information and angle information about the detected subject region is changed, and
wherein the predetermined timing is a timing at which the detection circuit determines that at least one of the size information and the angle information about the detected subject region is changed.

11. The image processing apparatus according to claim 1,
wherein, in a case where the tracking circuit tracks the recognized subject region, the recognition circuit calculates the similarity at predetermined timing, and
wherein the setting circuit sets, as the second threshold value, a value of the lowest similarity among the similarities calculated at the predetermined timings.

12. The image processing apparatus according to claim 1,
wherein, in a case where the tracking circuit tracks the recognized subject region, the recognition circuit calculates the similarity at predetermined timing,
wherein the detection circuit detects at least one of size information and angle information about the detected subject region, and
wherein the setting circuit stores a table that stores the similarities calculated at the predetermined timings in association with at least one of the size information and the angle information about the detected subject region, and the setting circuit sets, as the second threshold value, a value of the similarities that is read from the table based on at least one of the size information and the angle information about the detected subject region.

13. The image processing apparatus according to claim 12, wherein the setting circuit updates the table using the latest similarity and the size information and the angle information at the predetermined timings.

14. The image processing apparatus according to claim 1,
wherein, in a case where the tracking circuit does not track the recognized subject region and the setting circuit stores recognition information about the recognized subject region,
the setting circuit sets the second threshold value with respect to the subject region detected in a direction in which at least one of a panning operation and a tilting operation detected by an operation detection unit is performed, and
the setting circuit sets a threshold value that is greater than the second threshold value with respect to the subject region detected in an opposite direction to the direction.

15. The image processing apparatus according to claim 1,
wherein, in a case where the tracking circuit does not track the recognized subject region and the setting circuit stores recognition information about the recognized subject region and zooming is performed in a wide direction,
the setting circuit sets the second threshold value with respect to the subject region detected in a peripheral area of an image of the video signal, and
the setting circuit sets a threshold value that is greater than the second threshold value with respect to the subject region detected in a central area of the image of the video signal.

16. The image processing apparatus according to claim 1,
wherein, in a case where the tracking circuit does not track the recognized subject region and the setting circuit stores information about the recognized subject region and zooming is performed in a tele-direction,
the setting circuit sets the second threshold value with respect to the subject region detected in a central area of an image of the video signal, and
the setting circuit sets a threshold value that is greater than the second threshold value with respect to the subject region detected in a peripheral area of the image of the video signal.

17. The image processing apparatus according to claim 1,
wherein, in a case where the tracking circuit does not track the recognized subject region and the setting circuit stores recognition information about the recognized subject region,
the setting circuit sets the second threshold value with respect to the subject region detected in a position of the video signal in a screen in which the recognized subject region becomes unable to be tracked, and
the setting circuit sets a threshold value that is greater than the second threshold value according to a distance from the position in which the recognized subject region becomes unable to be tracked with respect to the subject region detected in another position.

18. The image processing apparatus according to claim 1, wherein the detection circuit detects, as the predetermined subject region, a face region of a person from the video signal.

19. An image processing method comprising:
detecting a predetermined subject region from a video signal;
setting a predetermined threshold value;
performing recognition processing on the subject region based on a comparison of a similarity between feature information extracted from the subject region and registered feature information with the predetermined threshold value;
tracking a recognized subject region; and
storing information about the recognized subject region tracked in the tracking,
wherein the setting sets a first threshold value as the predetermined threshold value for a first subject in a case where the recognized subject region is not tracked and recognition information about the first subject is not stored, and
wherein the setting sets, as the predetermined threshold value for the first subject, a second threshold value that is lower than the first threshold value in a case where the recognized subject region is not tracked and the recognition information about the first subject is stored.

20. A non-transitory computer-readable storage medium storing instructions that cause a computer to execute a method for controlling an image processing apparatus, the method comprising:
detecting a predetermined subject region from a video signal;
setting a predetermined threshold value;
performing recognition processing on the subject region based on a comparison of a similarity between feature information extracted from the subject region and registered feature information with the predetermined threshold value;

tracking a recognized subject region; and storing information about the recognized subject region tracked in the tracking, wherein the setting sets a first threshold value as the predetermined threshold value for a first subject in a case where the recognized subject region is not tracked and recognition information about the first subject is not stored, and wherein the setting sets, as the predetermined threshold value for the first subject, a second threshold value that is lower than the first threshold value in a case where the recognized subject region is not tracked and the recognition information about the first subject is stored.

* * * * *